(12) United States Patent
Bitincka et al.

(10) Patent No.: US 12,067,419 B1
(45) Date of Patent: *Aug. 20, 2024

(54) LOAD BALANCING COMPUTING RESOURCES IN AN OBSERVABILITY PIPELINE SYSTEM

(71) Applicant: Cribl, Inc., San Francisco, CA (US)

(72) Inventors: Dritan Bitincka, Edgewater, NJ (US); Ledion Bitincka, San Francisco, CA (US); Nicholas Robert Romito, Chicago, IL (US); Clint Sharp, Oakland, CA (US)

(73) Assignee: Cribl, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,427

(22) Filed: Jun. 27, 2023

Related U.S. Application Data

(63) Continuation of application No. 17/346,881, filed on Jun. 14, 2021, now Pat. No. 11,748,160.

(51) Int. Cl.
  *G06F 9/48* (2006.01)
  *G06F 9/38* (2018.01)
  *G06F 9/50* (2006.01)

(52) U.S. Cl.
  CPC .......... *G06F 9/4887* (2013.01); *G06F 9/3842* (2013.01); *G06F 9/505* (2013.01); *G06F 9/5072* (2013.01)

(58) Field of Classification Search
  None
  See application file for complete search history.

(56) References Cited

U.S. PATENT DOCUMENTS

| | | |
|---|---|---|
| 10,367,676 B1 | 7/2019 | Vermeulen et al. |
| 10,691,728 B1 | 6/2020 | Masson et al. |
| 11,057,414 B1 | 7/2021 | Giorgio et al. |
| 2012/0066683 A1 | 3/2012 | Srinath |
| 2018/0300174 A1 | 10/2018 | Karanasos et al. |
| 2018/0349212 A1 | 12/2018 | Liu et al. |

(Continued)

OTHER PUBLICATIONS

USPTO, Notice of Allowance issued in U.S. Appl. No. 17/346,881 on Jun. 1, 2023, 14 pages.

(Continued)

*Primary Examiner* — Eric C Wai
(74) *Attorney, Agent, or Firm* — Henry Patent Law Firm PLLC

(57) ABSTRACT

Load balancing processes are performed in an observability pipeline system comprising a plurality of computing resources. In some aspects, the observability pipeline system defines a leader role and worker roles. A plurality of computing jobs each include computing tasks associated with event data. The leader role dispatches the computing tasks to the worker roles according to a least in-flight task dispatch criteria, which includes iteratively: identifying an available worker role; identifying one or more incomplete computing jobs; selecting, from the one or more incomplete computing jobs, a computing job that has the least number of in-flight computing tasks currently being executed in the observability pipeline system; identifying a next computing task from the selected computing job; and dispatching the next computing task to the available worker role. The worker roles execute the computing tasks by applying an observability pipeline process to the event data associated with the respective computing task.

20 Claims, 9 Drawing Sheets

(56) References Cited

U.S. PATENT DOCUMENTS

| | | |
|---|---|---|
| 2019/0121978 A1 | 4/2019 | Kraemer et al. |
| 2020/0272114 A1 | 8/2020 | Grabowski et al. |
| 2020/0327037 A1 | 10/2020 | Toal et al. |

OTHER PUBLICATIONS

"Load Balancing (Computing)", en.wikipedia.org/w/index.php?title=Load_balancing_(computing)&oldid=1028284441, Jun. 13, 2021, 15 pgs.

"Round-robin Scheduling", en.wikipedia.org/w/index.php?title=Round-robin_scheduling&oldid=1019633430, Apr. 24, 2021, 5 pgs.

Bitincka, Dritan, "Collectors", docs.cribl.io/docs/collectors, accessed Jun. 13, 2021, version last updated Jun. 5, 2021, 6 pgs.

Cribl, Inc., "Distributed Deployment", docs.cribl.io/docs/deploy-distributed, accessed Jun. 13, 2021, last updated May 21, 2021, 33 pgs.

Litras, Steve, "Data Collection is Here", cribl.io/blog/data-collection-is-here/ accessed Jun. 13, 2021, last updated Jun. 15, 2020, Jun. 15, 2020, 7 pgs.

Litras, "Working with Data in LogStream 2.2", cribl.io/blog/working-with-data-in-logstream-2-2/, Jul. 14, 2020, 5 pgs.

Romito, "Demystifying Collection Job Scheduling", cribl.io/blog/demystifying-collection-job-scheduling/, Jun. 24, 2020, 9 pgs.

Sharp, "Building an observability pipeline on top of open source Apache NiFi, Logstash, or Fluentd: a journey", cribl.io/blog/building-an-observability-pipeline-on-top-of-open-source-apache-nifi-logstash-or-fluentd-a-journey/, Jan. 21, 2020, 7 pgs.

Sharp, Clint. "Grappling with Observability Data Management", thenewstack.io/grappling-with-observability-data-management/, Mar. 31, 2021, 13 pgs.

Sharp, "The Observability Pipeline", cribl.io/blog/the-observability-pipeline/, Oct. 10, 2019, 10 pgs.

Treat, Tyler, "Microservice Observability, Part 2: Evolutionary Patterns for Solving Observability Problems", bravenewgeek.com/microservice-observability-part-2-evolutionary-patterns-for-solving-observability-problems/, Jan. 3, 2020, 8 pgs.

Turiff, Bryan, "Announcing Cribl LogStream 2.2: Baby Got Batch!", cribl.io/logstream-2-2-baby-got-batch/ accessed Jun. 13, 2021, last updated Jun. 15, 2020, Jun. 15, 2020, 9 pgs.

USPTO, Non-Final Office Action issued in U.S. Appl. No. 17/346,887 on Feb. 8, 2024, 27 pages.

Sambasivan, Raja R., et al., "Principled workflow-centric tracing of distributed systems", ACM, dl.acm.org/doi/pdf/10.1145/2987550.2987568>, 2016, pp. 401-414, 14 pages.

Scrocca, Mario, et al., "The Kaiju Project: Enabling Event-Driven Observability", ACM, dl.acm.org/doi/pdf/10.1145/3401025.3401740>, 2020, pp. 85-96, 12 pages.

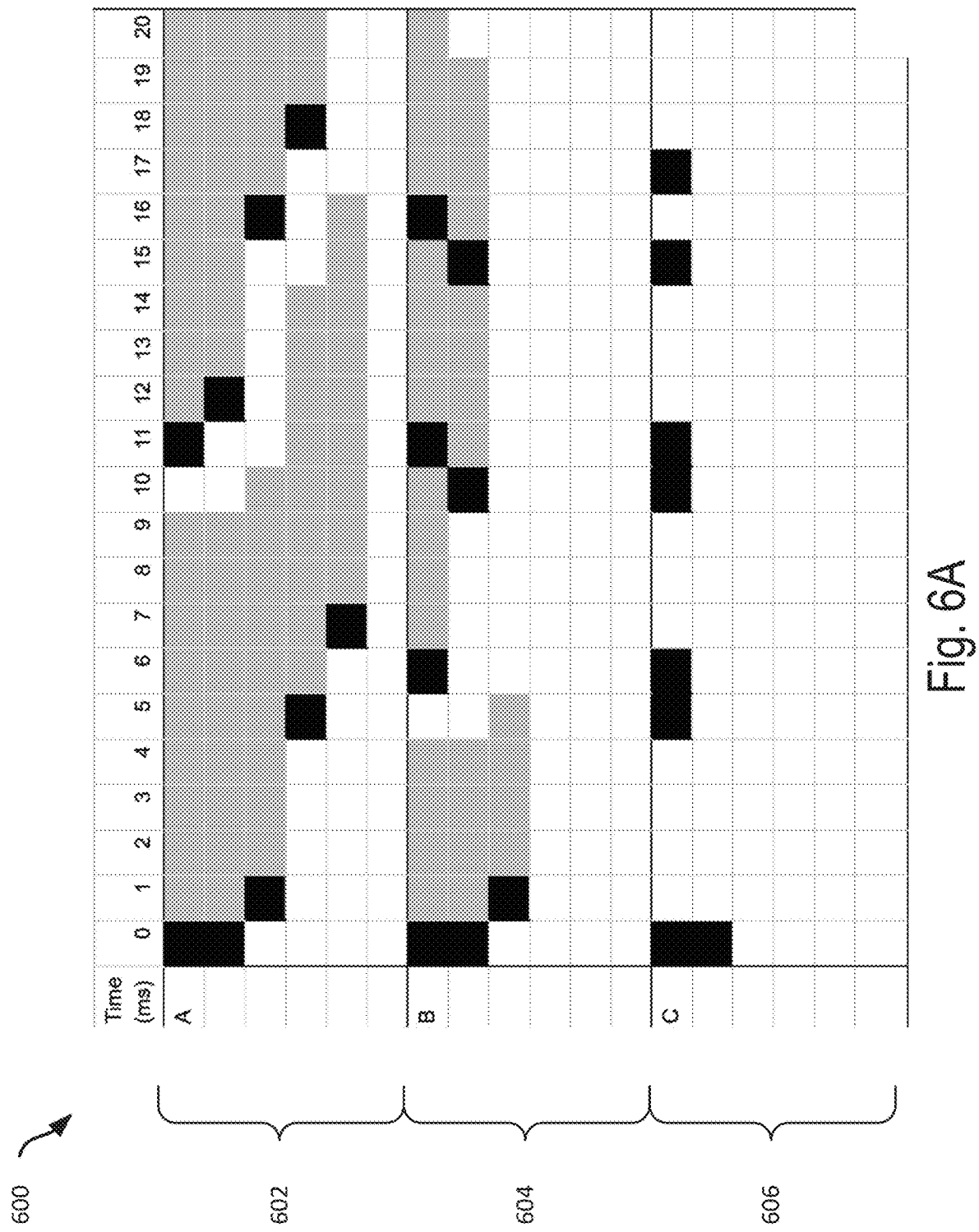

LOAD BALANCING COMPUTING RESOURCES IN AN OBSERVABILITY PIPELINE SYSTEM

This application is a continuation of U.S. application Ser. No. 17/346,881 filed Jun. 14, 2021, entitled "Load Balancing Computing Resources in an Observability Pipeline System". The above-referenced priority application is hereby incorporated by reference.

The following description relates to load balancing compute resources in an observability pipeline system.

Observability pipelines are used to route and process data in a number of contexts. For example, observability pipelines can provide unified routing of various types of machine data to multiple destinations, while adapting data shapes and controlling data volumes. In some implementations, observability pipelines allow an organization to interrogate machine data from its environment without knowing in advance the questions that will be asked. Observability pipelines may also provide monitoring and alerting functions, which allow systematic observation of data for known conditions that require specific action or attention.

DESCRIPTION OF DRAWINGS

FIG. 6A is a utilization timeline showing an example load balancing process that uses a round robin dispatch criteria.

DETAILED DESCRIPTION

Figure 1:
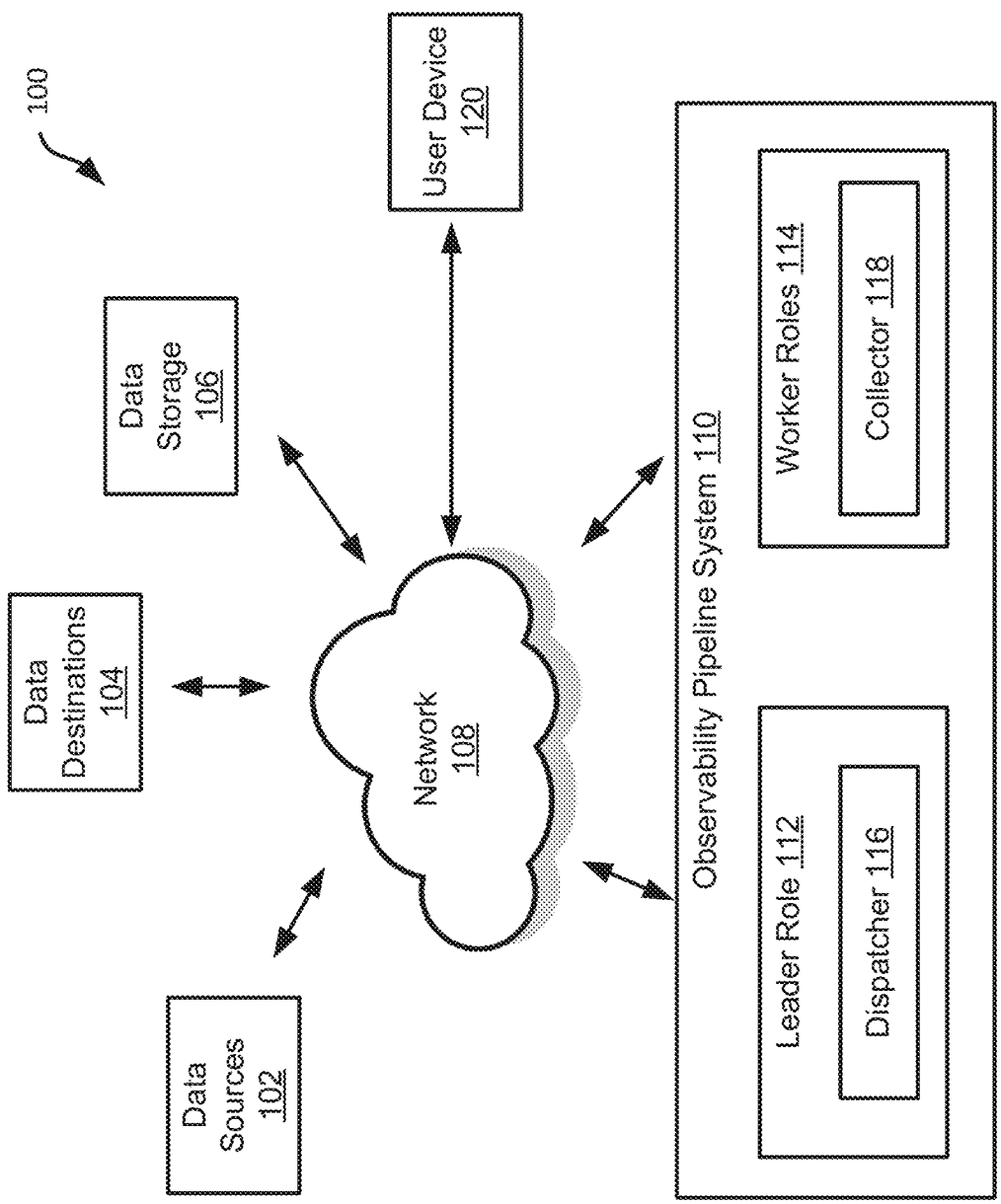
FIG. 1 is a block diagram showing aspects of an example computing environment that includes an observability pipeline system.

In some aspects of what is described here, data payloads from external data storage systems are processed in an observability pipeline system. For example, the observability pipeline system can include data collectors that perform batch data ingestion from archival data stores, allowing the archival data to be processed in the same way as a live data stream. Data collectors can be configured for a number of different external data storage systems and formats, and data collection jobs can be configured to collect specific types of data and apply custom analytics. For example, a data collection job may filter data for troubleshooting or analysis, convert log data to metrics, drop superfluous fields or unnecessary data, sample logs or log lines, or perform other types of filtering while preserving the original event data in the external storage system. In some cases, data collectors can provide a range of functionality, for example, retrieving event data from storage; applying aggregation, enrichment, filtering, sampling, or other processes; and delivering the output to any destination.

The systems and techniques described here can provide technical advantages and improvements over existing technologies. As an example, data collectors can provide increased flexibility and efficiency for analyzing archived data. In some implementations, data collectors allow an observability pipeline to process data from external data storage systems such as, for example, network file systems (NFS), S3 buckets, AWS Glacier, S3-compatible stores, and other cloud-based or network-based data storage systems. For instance, an organization may have a data lake that stores event data, and a data collector can enable the observability pipeline to process the stored data alongside live data streams from other sources. The ability to collect data from external data storage systems and replay it to an analytics tool at any point in time can provide tremendous flexibility in how machine data are processed in the first place. This can allow enterprise computer systems to extract value from machine data while conserving computing resources. Accordingly, aspects of the systems and techniques described here can be used to improve the operation of computer systems, information and data management systems, observability pipeline systems, and other classes of technology.

In some implementations, data collectors can provide additional technical advantages and improvements when applied to a number of enterprise computing applications. In some cases, the volume of data sent to analytics tools is reduced, which saves storage capacity and cost. Data that has analytical value now can be discerned from data that can be archived for analysis later or dropped altogether. Sending more data to an indexed analytics tool generally increases license and infrastructure costs. Separating out only the data that needs to be analyzed today from the rest saves significant computing resources and costs. The ability to collect data from storage and replay it at a later time allows an enterprise to be more aggressive, for example, reducing the amount of data sent to analytics tools while putting full fidelity into storage. In some cases, this can also enable better approaches for data retention. Many industries and organizations have retention policies that require keeping data for a specified period of time, and there is significantly higher cost associated with retaining data in data analytics systems. By only putting data that needs to be analyzed in real-time directly into a logging tool and routing a full copy of the data to a lower-cost data storage system, the cost of data retention can be significantly reduced. Allowing data to be collected from data storage and replayed to analytics tools reduces the need to retain data in the analytics tools themselves. In some cases, data collectors enable better investigation of security breaches and other incidents related to computing infrastructure. Most security breaches are discovered long after they start; recent examples show that it can take years to learn that a security breach is ongoing. Most organizations cannot provide the resources to retain security logs in their analytics tools for many years. Data collectors allow full-fidelity data to be stored in a low-cost storage location for years, if not indefinitely, and collected for analysis as needed. For instance, when security breaches or other incidents are discovered, data can be collected from storage, filtered according to the target time range and other criteria, and security logs can be replayed to any tool of choice. As such, data collectors enable efficient strategies for keeping data long-term, so that organizations do not have to support a massive computing infrastructure in order to make data available for a proper investigation or analysis of incidents.

In some aspects of what is described here, an observability pipeline system balances computing resources across computing jobs. For example, the observability pipeline system uses dispatch criteria to select computing tasks to be executed by available computing resources. The dispatch criteria can be configured to allocate computing resources in a fair manner, for instance, balancing computing resources across a number of computing jobs that have different task durations. In some examples, a least in-flight task dispatch criterion is used to dispatch computing tasks to available worker roles. For instance, when a worker role is available, a leader role can identify a computing job with the least number of in-flight computing tasks, and dispatch a computing task from that computing job to the available worker role. This can provide technical advantages and improvements in the observability pipeline system. For example, certain computing jobs (e.g., certain data collection jobs) may have longer running tasks compared to other computing jobs, and a dispatch resource that performs appropriate load balancing for a variety of computing jobs can improve the overall speed and processing efficiency of the observability pipeline system. In some cases, a dispatch resource can equitably load balance tasks across each computing job instead of gravitating resources towards the computing job with longer running tasks. In some instances, this increases utilization and causes some or all of the computing jobs to be completed faster (in less time overall) without requiring additional computing resources.

FIG. 1 is a block diagram showing aspects of an example computing environment 100 that includes an observability pipeline system 110. In addition to the observability pipeline system 110, the example computing environment 100 shown in FIG. 1 includes data sources 102, data destinations 104, data storage 106, network 108, and a user device 120. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, various data sources 102 in an organization's computing infrastructure produce volumes of machine data that contain valuable or useful information. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability pipeline system 110 can receive and process the machine data generated by the data sources 102. For example, the machine data can be processed to diagnose performance problems, monitor user interactions, and to derive other insights about the computing environment 100. Generally, the machine data generated by the data sources 102 does not have a common format or structure, and the observability pipeline system 110 can generate structured output data having a specified form, format, or type. The output generated by the observability pipeline system can be delivered to data destinations 104, data storage 106, or both. In some cases, the data delivered to the data storage 106 includes the original machine data that was generated by the data sources 102, and the observability pipeline system 110 can later retrieve and process the machine data that was stored on the data storage 106.

In general, the observability pipeline system 110 can provide a number of services for processing and structuring machine data for an enterprise or other organization. In some instances, the observability pipeline system 110 provides schema-agnostic processing, which can include, for example, enriching, aggregating, sampling, suppressing, or dropping fields from nested structures, raw logs, and other types of machine data. The observability pipeline system 110 may also function as a universal adapter for any type of machine data destination. For example, the observability pipeline system 110 may be configured to normalize, denormalize, and adapt schemas for routing data to multiple destinations. The observability pipeline system 110 may also provide protocol support, allowing enterprises to work with existing data collectors, shippers, and agents, and providing simple protocols for new data collectors. In some cases, the observability pipeline system 110 can test and validate new configurations and reproduce how machine data was processed. The observability pipeline system 110 may also have responsive configurability, including rapid reconfiguration to selectively allow more verbosity with pushdown to data destinations or collectors. The observability pipeline system 110 may also provide reliable delivery (e.g., at least once delivery semantics) to ensure data integrity with optional disk spooling.

The data sources 102, data destinations 104, data storage 106, observability pipeline system 110, and the user device 120 are each implemented by one or more computer systems that have computational resources (e.g., hardware, software, firmware) that are used to communicate with each other and to perform other operations. For example, each computer system may be implemented as the example computer system 700 shown in FIG. 7 or components thereof. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability pipeline system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. The data sources 102 detect, monitor, create, or otherwise produce machine data during their operation. The machine data are provided to the observability pipeline system 110 through the network 108. In some cases, the machine data are streamed to the observability pipeline system 110 as pipeline input data.

The data sources 102 can include data sources designated as push sources (examples include Splunk TCP, Splunk HEC, Syslog, Elasticsearch API, TCP JSON, TCP Raw, HTTP/S, Raw HTTP/S, Kinesis Firehose, SNMP Trap, Metrics, and others), pull sources (examples include Kafkaj, Kinesis Streams, SQS, S3, Google Cloud Pub/Sub, Azure Blob Storage, Azure Event Hubs, Office 365 Services, Office 365 Activity, Office 365 Message Trace, Prometheus) and other data sources types.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The pipeline output data produced by the observability pipeline system 110 can be communicated to the data destinations 104 through the network 108.

The data storage 106 can include multiple user devices, servers, databases, or a combination of these and other types of data storage systems. Generally, the data storage 106 can operate as a data source or a data destination (or both) for the observability pipeline system 110. In some examples, the data storage 106 includes a local or remote filesystem location, a network file system (NFS), Amazon S3 buckets, S3-compatible stores, other cloud-based data storage systems, enterprise databases, systems that provides access to data through REST API calls or custom scripts, or a combination of these and other data storage systems. The pipeline output data, which may include the machine data from the data sources 102 as well as data analytics and other output from the observability pipeline system 110, can be communicated to the data storage 106 through the network 108.

The observability pipeline system 110 may be used to monitor, track, and triage events by processing the machine data from the data sources 102. The observability pipeline system 110 can receive an event data stream from each of the data sources 102 and identify the event data stream as pipeline input data to be processed by the observability pipeline system 110. The observability pipeline system 110 generates pipeline output data by applying observability pipeline processes to the pipeline input data, and communicates the pipeline output data to the data destinations 104. In some implementations, the observability pipeline system 110 operates as a buffer between data sources and data destinations, such that all data sources send their data to the observability pipeline system 110, which handles filtering and routing the data to proper data destinations.

In some implementations, the observability pipeline system 110 unifies data processing and collection across many types of machine data (e.g., metrics, logs, and traces). The machine data can be processed by the observability pipeline system 110 by enriching it and reducing or eliminating noise and waste. The observability pipeline system 110 may also deliver the processed data to any tool in an enterprise designed to work with observability data. For example, the observability pipeline system 110 may analyze event data and send analytics to multiple data destinations 104, thereby enabling the systematic observation of event data for known conditions which require attention or other action. Consequently, the observability pipeline system 110 can decouple sources of machine data from data destinations and provide a buffer that makes many, diverse types of machine data easily consumable.

In some example implementations, the observability pipeline system 110 can operate on any type of machine data generated by the data sources 102 to properly observe, monitor, and secure the running of an enterprise's infrastructure and applications while minimizing overlap, wasted resources, and cost. Specifically, instead of using different tools for processing different types of machine data, the observability pipeline system 110 can unify data collection and processing for all types of machine data (e.g., logs 204, metrics 206, and traces 208 shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability pipeline system 110 obtains DogStatsd metrics, processes the DogStatsd metrics (e.g., by enriching the metrics), sends processed data having high cardinality to a first destination (e.g., Honeycomb) and processed data having low cardinality to a second, different destination (e.g., Datadog). In another example, the observability pipeline system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data is obtained from a Splunk forwarder and processed (e.g., sampled). The raw processed data may be sent to a first destination (e.g., Splunk). The raw processed data may further be parsed, and structured events may be sent to a second destination (e.g., Snowflake).

The example observability pipeline system 110 shown in FIG. 1 includes a leader role 112 and multiple worker role 114. The leader role 112 leads the overall operation of the observability pipeline system 110 by configuring and monitoring the worker roles 114; the worker roles 114 receive event data streams from the data sources 102 and data storage 106, apply observability pipeline processes to the event data, and deliver pipeline output data to the data destinations 104 and data storage 106.

The observability pipeline system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each worker role 114 may be deployed on distinct computer nodes. The distinct computer nodes can be, for example, distinct computer devices, virtual machines, containers, processors, or other types of computer nodes.

The example leader role 112 includes a dispatcher 116, which can dispatch computing tasks to individual worker roles. For example, the dispatcher 116 may be used to dispatch data collection tasks or other types of computing tasks. In some cases, the dispatcher 116 performs load balancing or other types of processes to manage computing resources. For instance, the dispatcher 116 may operate as described with respect to FIGS. 4, 5, and 6, or the dispatcher 116 may operate in another manner.

The dispatcher 116 can be deployed as a software resource executed by a server, a user device, a cloud-based computing resource, or another type of computer device. In some implementations, the dispatcher 116 selects computing tasks to be executed by available computing resources in an efficient manner. In some cases, the dispatcher 116 uses dispatch criteria that equitably balances computing resources across a number of computing jobs that have different task durations, and allows one or more of the computing jobs to be completed faster or otherwise more efficiently, relative to another dispatch criteria given the same computing resources. In some cases, the dispatcher 116 can handle scheduled data collection jobs, which can make batch collection of stored data more like continual processing of streaming data.

The example worker roles 114 each include a collector 118. The collector 118 may be used to execute data collection tasks that retrieve and process data from external data storage devices (e.g., data storage 106). In some cases, the collector 118 operates as described with respect to FIGS. 2, 3A, or 3B, or the collector 118 may operate in another manner.

The collector 118 can be deployed as a software resource executed by a server, a user device, a cloud-based computing resource, or another type of computer device. In some implementations, the collector 118 can process data from inherently non-streaming sources (such as, e.g., REST endpoints, blob stores, etc.) and emulate a data stream by scraping data from these sources in batches, on a set interval, which essentially transforms a non-streaming data source into a streaming data source. In some cases, a worker role 114 has multiple types of collectors 118 for different types of data storage systems. For instance, an observability pipeline system may provide Filesystem/NFS collectors that enable data collection from local or remote filesystem locations; S3 collectors that enable data collection from Amazon S3 buckets or S3-compatible stores; script collectors that enable data collection via custom scripts; REST collectors that enable data collection via REST API calls; or a combination of these and other types of collectors.

In some implementations, the collectors 118 can be configured to collect data in an ad hoc manner from data storage 106; track status of data collection jobs; control execution (e.g., initiate, pause, cancel) of running data collection jobs; filter files or other forms of data stored on the data storage 106; save parameterized data collection jobs for running later; pipeline function for triggering an ad hoc collection; sample data collection jobs before they are run in full run mode; route collection job data to an event processor (routes, pipelines, etc.) or directly to a pipeline and output combination; or perform a combination of these and other processes.

In some cases, the collector 118 executes data collection tasks that are generated by the leader role 112 according to configuration information from the user device 120. For instance, a user may configure specific data collection jobs through a user interface provided on the user device 120. In some cases, a user can schedule or manually run a data collection job, and select settings such as the run mode (e.g., preview mode, discovery mode, or full run mode) and the filter criteria (e.g., time range, file type, etc.) to match the data against. The observability pipeline system 110 can use the configuration information to generate a data collection job, which is typically made up of one or more computing tasks that discover the data to be fetched; fetch data that match the filter criteria; and pass the results through selected routes, analytics, or schemas (or a combination of them) in an observability pipeline process.

In some cases, the collector 118 provides status information to the user device 120, and the user device 120 provides a graphical interface that displays information about data collection jobs. For example, the graphical interface may include a job inspector that allows a user to view and manage pending, in-flight, and completed collection jobs. The graphical interface may allow a user to view jobs forward-scheduled for future execution (including their schedule details, last execution, and next scheduled execution), or all jobs initiated in the past, regardless of completion status. The graphical interface may allow a user to view job categories (e.g., ad hoc, scheduled, system, and running), filter the jobs shown within a selected job category, sort, search, and select individual collection jobs or groups of collection jobs, initiate actions for selected collection jobs through action buttons (e.g., run, pause, stop, re-run, live display, keep job artifacts, copy job artifacts, delete job artifacts, display job logs).

The user device 120, the observability pipeline system 110, or both, can provide a user interface for the observability pipeline system 110. Aspects of the user interface can be rendered on a display (e.g., the display 750 in FIG. 7) or otherwise presented to a user. The user interface may be generated by an observability pipeline application that interacts with the observability pipeline system 110. The observability pipeline application can be deployed as software that includes application programming interfaces (APIs), graphical user interfaces (GUIs), and other modules.

In some implementations, an observability pipeline application can be deployed as a file, executable code, or another type of machine-readable instructions executed on the user device 120. The observability pipeline application, when executed, may render GUIs for display to a user (e.g., on a touchscreen, a monitor, or other graphical interface device), and the user can interact with the observability pipeline application through the GUIs. Certain functionality of the observability pipeline application may be performed on the user device 120 or may invoke the APIs, which can access functionality of the observability pipeline system 110. The observability pipeline application may be rendered and executed within another application (e.g., as a plugin in a web browser), as a standalone application or otherwise. In some cases, an observability pipeline application may be deployed as an installed application on a workstation, as an "app" on a tablet or smartphone, as a cloud-based application that accesses functionality running on one or more remote servers, or otherwise.

In some implementations, the user interface provided by the user device 120 (e.g., through an observability pipeline application) allows users to preview a data collection job before running it; view the current status of a data collection job; cancel or pause a running data collection job; filter by template variables in file names (e.g., timestamps embedded in file name); filter by file type (e.g., .log, .gz, etc.), for example, using a wildcard field that matches against the leaf file name; save a template that can be reused without re-entering API keys or bucket names each time; define a pipeline function for a data collection job; and possibly other operations.

In some implementations, the observability pipeline system 110 is a standalone computer system that includes only a single computer node. For instance, the observability pipeline system 110 can be deployed on the user device 120 or another computer device in the computing environment 100. For example, the observability pipeline system 110 and can be implemented on a laptop or workstation. The standalone computer system can operate as the leader role 112 and the worker roles 114, and may execute an observability pipeline application that provides a user interface as described above. In some cases, the leader role 112 and each of the worker roles 114 are deployed on distinct hardware components (e.g., distinct processors, distinct cores, distinct virtual machines, etc.) within a single computer device. In such cases, the leader role 112 and each of the worker roles 114 can communicate with each other by exchanging signals within the computer device, through a shared memory, or otherwise.

In some implementations, the observability pipeline system 110 is deployed on a distributed computer system that includes multiple computer nodes. For instance, the observability pipeline system 110 and can be deployed on a server cluster, on a cloud-based "serverless" computer system, or another type of distributed computer system. The computer nodes in the distributed computer system may include a leader node operating as the leader role 112 and multiple worker nodes operating as the respective worker roles 114. One or more computer nodes of the distributed computer system (e.g., the leader node) may communicate with the user device 120, for example, through an observability pipeline application that provides a user interface as described above. In some cases, the leader node and each of the worker nodes are distinct computer devices in the computing environment 100. In some cases, the leader node and each of the worker nodes can communicate with each other using TCP/IP protocols or other types of network communication protocols transmitted over a network (e.g., the network 108 shown in FIG. 1) or another type of data connection.

In some implementations, the observability pipeline system 110 is implemented by software installed on private enterprise servers, a private enterprise computer device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability pipeline system 110 and the user device 120 (and potentially other elements of the computer environment 100) operate behind a common firewall or other network security system.

In some implementations, the observability pipeline system 110 is implemented by software running on a cloud-based computing system that provides a cloud hosting service. For example, the observability pipeline system 110 may be deployed as a Saas system running on the cloud-based computing system. For example, the cloud-based computing system may operate through Amazon® Web Service (AWS) Cloud, Microsoft Azure Cloud, Google Cloud, DNA Nexus or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability pipeline system 110 and the user device 120 (and potentially other elements of the computer environment 100) operate behind different firewalls, and communication between them can be encrypted or otherwise secured by appropriate protocols (e.g., using public key infrastructure or otherwise).

Figure 2:
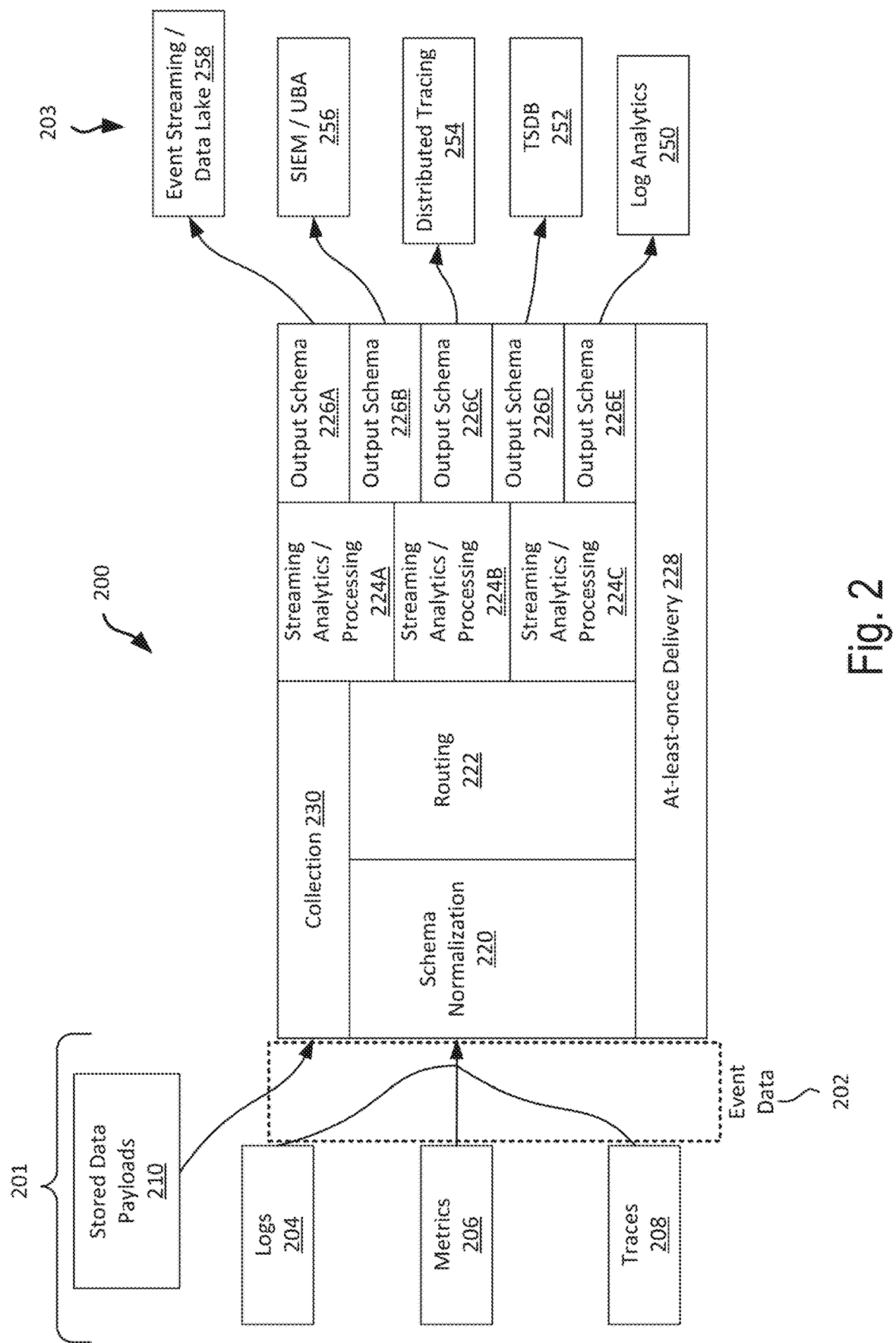
FIG. 2 is a block diagram showing aspects of an example observability pipeline system deployed in a worker role.

FIG. 2 is a block diagram showing aspects of an example observability pipeline process 200 that can be applied by a worker role in an observability pipeline system. For example, the observability pipeline process 200 may be performed by one or more of the worker roles 114 shown in FIG. 1, the worker role 314 shown in FIG. 3B, one or more of the worker roles 414 shown in FIG. 4, one or more of the worker roles 514A, 514B, 514C shown in FIG. 5, or a worker role in another observability pipeline system.

The example observability pipeline process 200 shown in FIG. 2 includes data collection 230, schema normalization 220, routing 222, streaming analytics and processing 224A, 224B, 224C, and output schematization 226A, 226B, 226C, 226D, 226E. The observability pipeline process 200 may include additional or different operations, and the operations of the observability pipeline process 200 may be performed as described with respect to FIG. 2 or in another manner. In some cases, one or more of the operations can be combined, or an operation can be divided into multiple sub-processes. Certain operations may be iterated or repeated, for example, until a terminating condition is reached.

As shown in FIG. 2, the observability pipeline process 200 is applied to pipeline input data 201 from data sources, and the observability pipeline process 200 delivers pipeline output data 203 to data destinations. The data sources can include any of the example data sources 102 or data storage 106 described with respect to FIG. 1, and the data destinations can include any of the example data destinations 104 or data storage 106 described with respect to FIG. 1.

The example pipeline input data 201 shown in FIG. 2 includes logs 204, metrics 206, traces 208, stored data payloads 210 and possibly other types of machine data. In some cases, some or all of the machine data can be generated by agents (e.g. Fluentd, Collectd, OpenTelemetry) that are deployed at the data sources, for example, on various types of computing devices in a computing environment (e.g., in the computing environment 100 shown in FIG. 1, or another type of computing environment). The logs 204, metrics 206, and traces 208 can be decomposed into event data 202 that are consumed by the observability pipeline process 200. In some instances, logs 204 can be converted to metrics 206, metrics 206 can be converted to logs 204, or other types of data conversion may be applied.

In the example shown, the stored data payloads 210 represent event data retrieved from external data storage systems. For instance, the stored data payloads 210 can include event data that an observability pipeline process previously provided as output to the external data storage system.

The event data 202 are streamed to the observability pipeline process 200 for processing. Here, streaming refers to a continual flow of data, which is distinct from batching or batch processing. With streaming, data are processed as they flow through the system continuously (as opposed to batching, where individual batches are collected and processed as discrete units). As shown in FIG. 2, the event data from the logs 204, metrics 206 and traces 208 are streamed directly to the schema normalization process (at 220) without use of the collection process (at 230), whereas the event data from the stored data payloads 210 are streamed to the collection process (at 230) and then streamed to the schema normalization process (at 220), the routing process (at 222) or the streaming analytics and processing (at 224).

In some instances, event data 202 represent events as structured or typed key value pairs that describe something that occurred at a given point in time. For example, the event data 202 can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the events data 202 are provided in the smallest unit of observability (e.g., for a given event type or computing environment). For instance, the event data 202 can include data elements that provide insight into the performance of the computing environment 100 to monitor, track, and triage incidents (e.g., to diagnose issues, reduce downtime, or achieve other system objectives in a computing environment).

In some instances, logs 204 represent events serialized to disk, possibly in several different formats. For example, logs 204 can be strings of text having an associated timestamp and written to a file (often referred to as a flat log file). The logs 204 can include unstructured logs or structured logs (e.g., in JSON format). For instance, log analysis platforms store logs as time series events, and the logs 204 can be decomposed into a stream of event data 202.

In some instances, metrics 206 represent lossily compressed events. For example, a metric can have a metric name, a metric value, and a low cardinality set of dimensions. In some implementations, metrics 206 can be aggregated sets of events grouped or collected at regular intervals, and stored for low cost and fast retrieval. The metrics 206 are not necessarily discrete and instead represent aggregates of data over a given time span. Types of metric aggregation are diverse (e.g., average, total, minimum, maximum, sum-of-squares) but metrics typically have a timestamp (representing a timespan, not a specific time); a name; one or more numeric values representing some specific aggregated value; and a count of how many events are represented in the aggregate.

In some instances, traces 208 represent a series of events with a parent/child relationship. A trace may provide information of an entire user interaction and may be displayed in a Gantt-chart like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent_id field). Spans without an identification of a parent event are rendered as root spans.

The example pipeline output data 203 shown in FIG. 2 include data formatted for log analytics platforms (250), data formatted for time series databases (TSDBs) (252), data formatted for distributed tracing systems (254), data formatted for security information and event management (SIEM) or user behavior analytics (UBA) systems 256, and data formatted for event streaming systems or data lakes 258 (e.g., a system or repository of data stored in its natural/raw format). Log analytics platforms are configured to operate on logs to generate statistics (e.g., web, streaming, and mail server statistics) graphically. TSDBs operate on metrics; example TSDBs include Round Robin Database (RRD), Graphite's Whisper, and OpenTSDB. Tracing systems operate on traces to monitor complex interactions, e.g., interactions in a microservice architecture. SIEMs provide real-time analysis of security alerts generated by applications and network hardware. UBA systems detect insider threats, targeted attacks, and financial fraud. Pipeline output data 203 may be formatted for, and delivered to, other types of data destinations in some cases.

In the example shown in FIG. 2, the observability pipeline process 200 includes a schema normalization module that (at 220) converts the various types of event data 202 to a common schema or representation to execute shared logic across different agents and data types. For example, machine data from various agents such as Splunk, Elastic, Influx, and OpenTelemetry have different, opinionated schemas, and the schema normalization module can convert the event data to normalized event data. Machine data intended for different destinations may need to be processed differently. Accordingly, the observability pipeline process 200 includes a routing module that (at 222) routes the normalized event data (e.g., from the schema normalization module 220) to different processing paths depending on the type or content of the event data. The routing module can be implemented by having different streams or topics. The routing module routes the normalized data to respective streaming analytics and processing modules. FIG. 2 shows three streaming analytics and processing modules, each applied to normalized data (at 224A, 224B, 224C); however, any number of streaming analytics and processing modules may be applied. Each of the streaming analytics and processing modules can aggregate, suppress, mask, drop, or reshape the normalized data provided to it by the routing module. The streaming analytics and processing modules can generate structured data from the normalized data provided to it by the routing module. The observability pipeline process 200 includes output schema conversion modules that (at 226A, 226B, 226C, 226D, 226E) schematize the structured data provided by the streaming analytics and processing modules. The structured data may be schematized for one or more of the respective data destinations to produce the pipeline output data 203. For instance, the output schema conversion modules may convert the structured data to a schema or representation that is compatible with a data destination. In some implementations, the observability pipeline process 200 includes an at-least-once delivery module that (at 228) applies delivery semantics that guarantee that a particular message can be delivered one or more times and will not be lost. In some implementations, the observability pipeline process 200 includes an alerting or centralized state module, a management module, or other types of sub-processes.

In the example shown in FIG. 2, the observability pipeline process 200 includes a collection module that (at 230) collects filtered event data from stored data payloads 210. For example, the stored data payloads 210 may represent event data that were previously processed and stored on the event streaming/data lake 258 or event data that were otherwise stored in an external data storage system. For example, some organizations have a high volume of data that is kept in storage systems (e.g., S3, Azure Blob Store, etc.) for warehousing purposes, or they may have event data that can be scraped from a REST endpoint (e.g., Prometheus). The collection module allows organizations to apply the observability pipeline process 200 to data from storage, REST endpoints, and other systems regardless of whether the data has been processed by an observability pipeline system in the past. The data collection module can retrieve the data from the stored data payload 210 on the external data storage system, stream the data to the observability pipeline process 200 (e.g., via the schema normalization module, the routing module, or a streaming analytics and processing module), and send the output to any of the data destinations 230. In some cases, the collection module represented in FIG. 2 may perform one or more operations of the worker role 314 in FIG. 3B, or the collection module may operate in another manner.

Figure 3A:
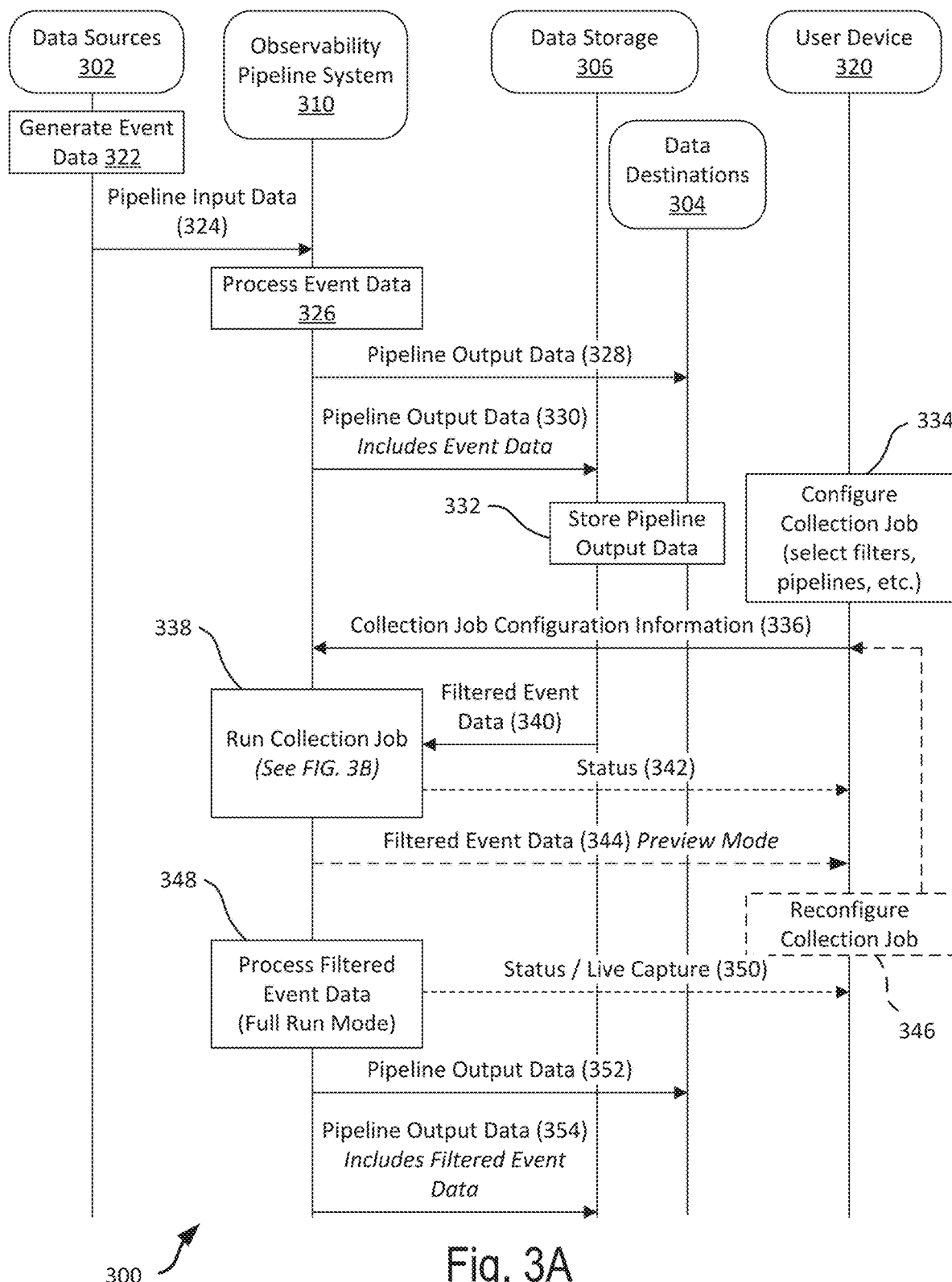
FIG. 3A is a signaling and flow diagram showing an example process for collecting filtered event data from an external data storage system.
Figure 3B:
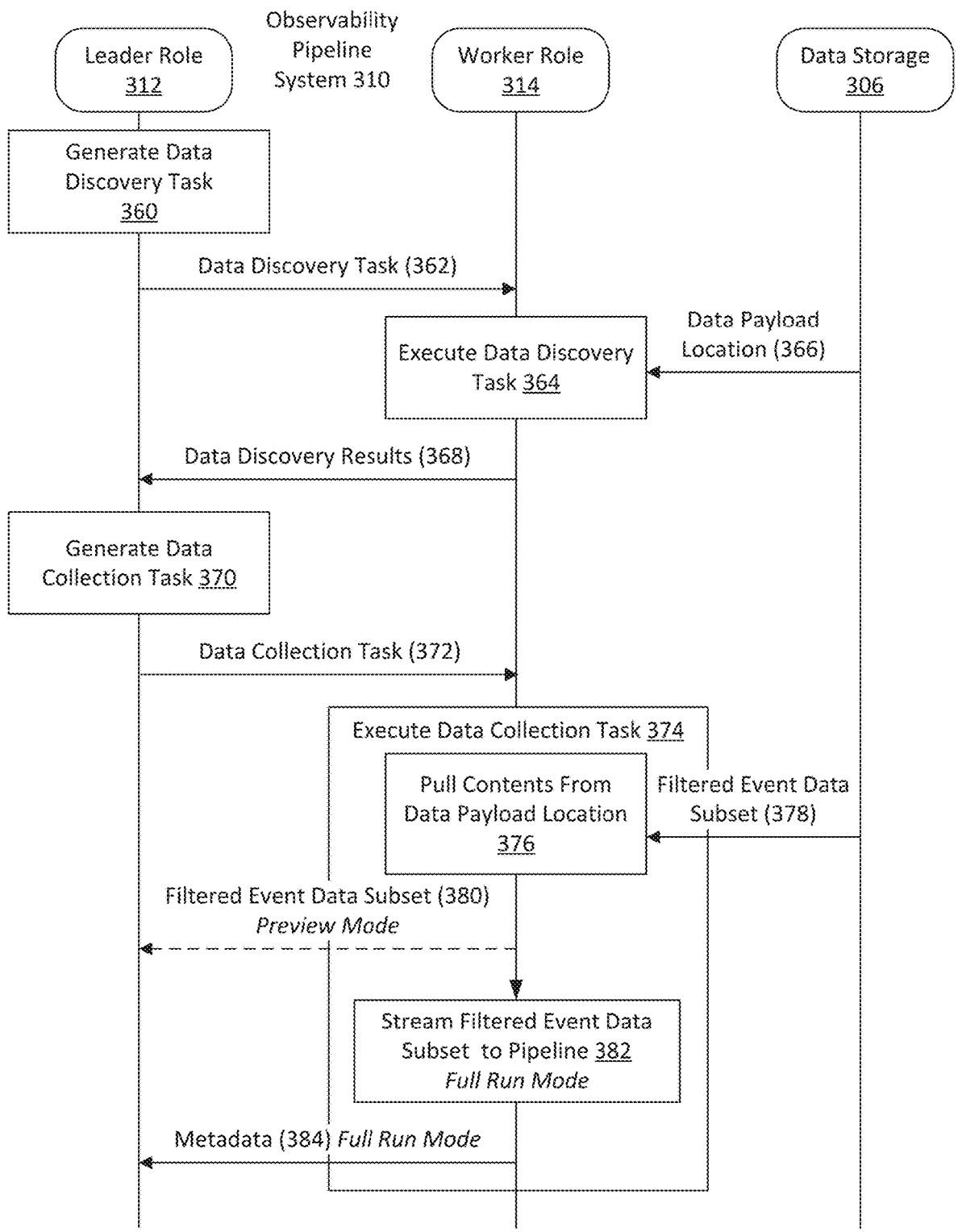
FIG. 3B is a signaling and flow diagram showing an example process for executing a data collection job in an observability pipeline system.

FIG. 3A is a signaling and flow diagram showing an example process for collecting filtered event data from an external data storage system and processing them in an observability pipeline system 310. FIG. 3B is a signaling and flow diagram showing an example process for executing a data collection job in the observability pipeline system 310. For example, the process shown in FIG. 3B may be used to run the collection job at 338 in FIG. 3A, or in another context. The example processes shown in FIGS. 3A and 3B may include additional or different operations, and the operations may be performed in another order. In some cases, one or more of the operations can be combined, or an operation can be divided into multiple sub-processes. Certain operations may be iterated or repeated, for example, until a terminating condition is reached.

The processes shown in FIGS. 3A and 3B are performed in a computing environment 300 that includes data sources 302, data destinations 304, data storage 306, the observability pipeline system 310, and a user device 320. The computing environment 300 may include additional or different features, and the elements of the computing environment 300 may operate as described with respect to FIGS. 3A and 3B or in another manner. In some cases, the data sources 302, data destinations 304, data storage 306, observability pipeline system 310, and user device 320 shown in FIG. 3A are implemented as the data sources 102, data destinations 104, data storage 106, the observability pipeline system 110, and user device 120 shown in FIG. 1, or they may be implemented in another manner.

The example observability pipeline system 310 includes one or more computer nodes that operate as a leader role and multiple worker roles. The leader role 312 and one of the worker roles 314 are shown in FIG. 3B. The leader role and worker roles of the observability pipeline system 310 can be implemented as the leader role 112 and the worker roles 114 shown in FIG. 1, or they may be implemented in another manner.

In some implementations, the observability pipeline system 310 shown in FIGS. 3A and 3B is deployed on a distributed computer system that includes multiple computer nodes. The computer nodes in the distributed computer system may include a leader node operating as the leader role 312 and multiple worker nodes operating as the worker roles. In some implementations, the observability pipeline system is deployed on a standalone computer system that includes only a single computer node. The computer node of the standalone computer system can operate as the leader role 312 and the worker roles.

At 322, the data sources 302 generate event data. The event data are machine data generated or received, for example, in an enterprise computer system. The event data may be generated over time as the data sources 302 operate. In some cases, the data sources 302 generate multiple types of event data, and each type of event data may be generated in a distinct format. The event data generated at 322 may include any of the example pipeline input data 201 shown in FIG. 2, or other types of event data.

At 324, the event data generated at 322 are provided to the observability pipeline system 310 as pipeline input data. For example, the pipeline input data may be communicated from the data sources 302 to the observability pipeline system 310 over a network (e.g., the network 108 shown in FIG. 1). In some cases, the pipeline input data are streamed to the observability pipeline system 310 (e.g., in real time or near real time) as new event data becomes available at the data sources 302.

At 326, the observability pipeline system 310 processes the event data. To process the event data, the observability pipeline system 310 applies one or more observability pipeline processes to the event data, which generates pipeline output data. For example, worker roles in the observability pipeline system 310 may generate pipeline output data by applying the observability pipeline process 200 shown in FIG. 2, or another type of observability pipeline process, to pipeline input data that include the event data.

At 328 and 330, the pipeline output data are delivered to external data destinations, which include the data destinations 304 and the data storage 306. For example, the observability pipeline output data may be delivered to external data destinations such as, for example, log analytics 250, TSDB 252, distributed tracing 254, SIEM/UBA 256, event streaming/data lake 258 shown in FIG. 2. The pipeline output data may be communicated from the observability pipeline system 310 to the external data destinations over a network (e.g., the network 108 shown in FIG. 1). In some cases, the pipeline output data are communicated to the external data destinations in multiple different formats (e.g., as different file types, etc.), for example, in formats that are appropriate for each destination. At 332, the pipeline output data are stored by the data destinations 304 and the data storage 306.

As shown in FIG. 3A, the pipeline output data delivered to the data storage 306 includes the event data that the observability pipeline system received (at 324) and processed (at 326) to generate the pipeline output data. In some cases, the event data may be stored (at 332) in the same format in which the event data was provided to the observability pipeline system 310 (at 324), or the event data may be converted to a different form or format for the data storage 306. In some cases, the event data are stored on the data storage 306 as unindexed event data.

In the example shown in FIG. 3A, the data storage 306 functions as a data destination by storing (at 332) the pipeline output data from the observability pipeline system 310, and the data storage 306 also functions as a data source by providing data payloads that are processed in the observability pipeline system 310. In particular, some of the event data stored by the data storage 306 (at 332) is collected (at 338) and re-processed (at 348) by the observability pipeline system 310. As such, subsets of the event data stored by the data storage 306 can be selectively "replayed" by the observability pipeline system 310, alongside new event data from any of the data sources 302. This functionality of the observability pipeline system 310 can be initiated by a data collection job, as discussed with respect to operations 334, 338, 346, 348, and others.

At 334, a data collection job is configured at the user device 320. Configuring the data collection job may include, for example, selecting filter parameters or other types of event filter criteria to apply to the event data, selecting a data pipeline or a certain observability pipeline process to apply to the event data, selecting a time to run the data collection job, selecting a mode (e.g., preview mode, full run mode, etc.) for the data collection job, etc.

At 336, configuration information for the data collection job is provided from the user device 320 to the observability pipeline system 310. For example, the configuration information may be communicated over a network (e.g., the network 108 shown in FIG. 1). The configuration information includes event filter criteria, which are used to collect filtered event data from the data storage 306. The event filter criteria may be used to locate filtered event data, for example, by indicating parameters of select event data to be retrieved from the data storage 306. For example, the event filter criteria may indicate a data source (e.g., a particular data source or a type of data source), a type of event, a time or date (or a range of times and dates), or other parameters of the event data to be selectively retrieved from the data storage 306. The configuration information may also indicate an observability pipeline process to be applied to the filtered event data, parameters for running the observability pipeline process, etc.

In the example shown in FIG. 3A, the event filter criteria are based on input received through a user interface of the user device 320. For example, a user may indicate (e.g., through a graphical user interface provided by a web page, an application, or another asset on the user device 320) parameters of select event data to be retrieved from storage and processed by the observability pipeline system 310. In addition to the event filter criteria, other aspects of the configuration information for the data collection job (e.g., identifying an observability pipeline process, etc.) may also be based on input received through the user interface of the user device 320. The configuration information may be selected by the user, for instance, through dropdown lists, labeled buttons, radio buttons, sliders, check box options, text boxes or other types of graphical user interface widgets.

At 338, the observability pipeline system 310 generates and runs a data collection job according to the configuration information received at 336. As shown in FIG. 3A, while running the data collection job (at 338), the observability pipeline system 310 communicates with the data storage 306 to obtain filtered event data from the data storage 306 (at 340). Communicating with the external data storage system to obtain filtered event data may include streaming the filtered event data from the data storage 306 to the observability pipeline system 310. For instance, subsets of filtered event data may be streamed to one or more of computer nodes operating as worker roles in the observability pipeline system 310.

While running the data collection job (at 338), the observability pipeline system 310 may also provide status information to the user device 320 (at 342), which can be displayed to a user. For example, the status information can include live capture information that can be used to display a representation of event data flowing through the observability pipeline system 310. The filtered event data retrieved at 340 are the event data that meet the event filter criteria included in the configuration information provided at 336. For example, the filtered event data retrieved at 340 may have a time stamp within a time range specified by the event filter criteria; a data type or data format specified by the event filter criteria; a file name or path name that matches the event filter criteria; an error code or event type specified by the event filter criteria; a data source specified by the event filter criteria; or a combination of any of these and other properties that meet the event filter criteria.

Certain aspects of running the data collection job at 338 and some of the subsequent operations in the process shown in FIG. 3A depend on whether the data collection job is being run in full run mode or preview mode. In some cases, a data collection job can be run in another mode.

FIG. 3B shows example operations that may be used to execute the data collection job at 338 in preview mode or full run mode. FIG. 3B shows a single worker role 314, but multiple worker roles may be used to execute the data collection job. Typically, a data collection job will include a data discovery task and multiple data collection tasks, and the data collection tasks may be executed independently (e.g., by multiple worker roles in parallel, by one worker role in series, or a combination of these). In some cases, the leader role 312 dispatches the data collection tasks, as well as other computing tasks, to the worker roles in response to work requests from the worker roles. The leader role 312 may include a dispatcher (e.g., the dispatcher 116 shown in FIG. 1) that applies dispatch criteria to perform load balancing among worker roles. In some cases, the leader role dispatches data collection tasks according to the example process shown in FIG. 4, or another type of load balancing process may be used.

As shown in FIG. 3B, the leader role 312 generates a data discovery task. The data discovery task is generated based on the configuration information received by the observability pipeline system 310. In the example shown, the data discovery task includes event filter criteria and possibly other information derived from the configuration information for the data collection job. The data discovery task is a computing task that is configured to locate event data that meet the event filter criteria. For instance, the data discovery task may be configured to find all event data of a certain type, provided by a particular data source over a particular time period. The data discovery task can be executed by a worker role, and may return information that identifies the storage location (e.g., file names, file addresses, URLs, etc.) of the event data that meet the event filter criteria.

At 362, the leader role 312 sends the data discovery task to the worker role 314; and at 364, the worker role 314 executes the data discovery task. To execute the data discovery task, the worker role 314 communicates with the data storage 306 to identify a data payload that is stored on the data storage 306 and contains event data that meet the event filter criteria. At 366, the data storage 306 provides to the worker role 314 information identifying the location of the data payload. The data payload can be, for example, information contained in a set of files or other types of data structures. The information provided to the worker role may include, for example, a list of files, a list of addresses, or other information that identifies the data payload location.

Executing the data discovery task at 364 generates data discovery results, which includes the data payload location information received at 366. In some cases, the data storage 306 in FIG. 3B represents multiple external data storage devices or systems, and the worker role 314 receives data payload location information from each of the external data storage devices or systems. In such cases, the data discovery results may include a collection of data payload locations associated with multiple external data storage devices or systems.

At 368, the worker role 314 sends the data discovery results to the leader role 312. The leader role 312 then generates data collection tasks based on the data discovery results. The data collection tasks are computing tasks that are configured to jointly collect the data payload (identified at 364) that contains the event data meeting the event filter criteria. Together, the data collection tasks collect the data payload, which forms the filtered event data in FIG. 3A, and each individual data collection task collects a subset of the filtered event data from the data payload. Each data collection task is executed by a respective worker role. FIG. 3B shows only one data collection task, but generally multiple data collection tasks will be generated and executed, by one or more worker roles, for an individual data collection job.

At 370, the leader role generates a data collection task. The data collection task may identify a particular portion of the data payload to be collected. For instance, an individual data collection task may identify an address or file name information for one or more data structures, an individual file or a subset of files from a list of files included in the data discovery results, or the data collection task may identify a portion of the data payload in another manner. When the data collection job is run in preview mode, the data collection task can be labeled as a preview mode data collection task. When the data collection job is run in full run mode, the data collection task can be labeled as a full run mode data collection task.

At 372, the leader role 312 sends the data collection task to the worker role 314; and at 374, the worker role executes the data collection task. To execute the data collection task, the worker role 314 communicates with the data storage 306 to obtain a subset of the filtered event data from the data payload. The subset of filtered event data contains a portion of the event data that meet the event filter criteria.

As shown in FIG. 3B, executing the data collection task includes, at 376, pulling content from the data payload location identified in the data collection task. The worker role 314 can communicate with the data storage 306 over a network (e.g., the network 108 shown in FIG. 1) to pull the subset of filtered event data at 376. In the example shown in FIG. 3B, the worker role 314 streams the content from data storage 306 at 378. The content streamed from the data storage 306 in FIG. 3B is a subset of the filtered event data received at 340 in FIG. 3A. A number of worker roles can each obtain a distinct subset of the filtered event data, such that the subsets obtained by the worker roles collectively form the full set of filtered event data represented at 340 in FIG. 3A.

In some cases, the data payload identified by the data discovery task (at 364) is contained in a set of files, and the subset of filtered event data received at 378 is the contents of a single file. For instance, the data collection task generated at 370 may indicate one of the files, and the worker role 314 may communicate with the data storage 306 to obtain contents of the file indicated by the data collection task. In some cases, the data payload identified by the data discovery task (at 364) is contained in a set of files, and the subset of filtered event data received at 378 is the contents of multiple files. For instance, the data collection task generated at 370 may indicate a subset of the set of files, and the worker role 314 may communicate with the data storage 306 to obtain contents of the subset of files indicated by the data collection task.

As shown in FIG. 3B, when the data collection job is executed in preview mode, executing the preview data collection task includes, at 380, sending the subset of filtered event data from the worker role 314 to the leader role 312. The leader role 312 may then send the subset of filtered event data to a user device (e.g., at 344 in FIG. 3A) or the leader role 312 may handle the subset of filtered event data in another manner.

As shown in FIG. 3B, when the data collection job is executed in full run mode, executing the full run mode data collection task includes, at 382, streaming the subset of filtered event data to an observability pipeline process. For example, the worker role 314 may identify the subset of filtered event data as pipeline input data to be processed by the worker role 314. Accordingly, the content that is streamed from storage at 378 is then streamed to the observability pipeline process at 382. When the observability pipeline 310 processes the filtered event data (at 348 in FIG. 3A), the worker role 314 applies the observability pipeline process to the subset of filtered event data that the worker role 314 streamed at 382. As such, the filtered event data are processed in the observability pipeline 310 (at 348 in FIG. 3A) by operation of the worker roles applying observability pipeline processes to respective subsets of the filtered event data. In particular, each worker role applies an observability pipeline process to the subset of filtered event data that it receives and streams (e.g., at 374 in FIG. 3B). The output generated by the worker roles can collectively form the pipeline output data generated at 348 in FIG. 3A.

As shown in FIG. 3A, when a data collection job is run in preview mode, the filtered event data are provided from the observability pipeline system 310 to the user device 320 (at 344). Preview mode can be used to allow a user to preview the filtered event data before processing the filtered event data. For example, the user device 320 may display a graphical representation of the filtered event data, or otherwise present the filtered event data to a user. The user can then determine whether to have the observability pipeline system 310 process the filtered event data. In general, processing the filtered event data consumes computing bandwidth and requires processing time, and running the data collection job in preview mode can ensure that time and computing resources are used appropriately and not wasted (e.g., ensuring that resources are only deployed on filtered event data that the user approves for processing).

At 346, after the filtered event data provided by the data collection job in preview mode has been assessed, the data collection job can be reconfigured. Reconfiguring the data collection job may include, for example, modifying filter parameters or other types of event filter criteria, selecting a different data pipeline or observability pipeline process, selecting a different mode (e.g., full run mode, etc.) for the data collection job, or a combination of these and other changes. In some cases, the data collection job is reconfigured by changing only the mode, for example, changing from preview mode to full run mode (or possibly another mode). As such, in some cases, configuration information for a data collection job in preview mode is received, and a preview mode data collection job is executed; then, configuration information for the same data collection job in full run mode is received, and a full run mode data collection job is executed. The same filtered event data may be collected by the same data collection job in preview mode and full run mode. In some cases, the reconfigured data collection job remains in preview mode.

As shown in FIG. 3A, when the data collection job is reconfigured at 346, new configuration information for a new data collection job is generated by the user device 320, and the process returns to 336, where the new configuration information is provided from the user device 320 to the observability pipeline system 310. The observability pipeline system 310 runs the new data collection job (at 338), and the process continues as shown and described.

As shown in FIG. 3A, when a data collection job is run in full run mode, the filtered event data are processed by the observability pipeline system 310 (at 348). When the filtered event data are processed by the observability pipeline system 310 (at 348), the observability pipeline system 310 applies one or more observability pipeline processes to the filtered event data, which generates pipeline output data. For example, worker roles in the observability pipeline system 310 may generate pipeline output data by applying the observability pipeline process 200 shown in FIG. 2, or another type of observability pipeline process, to pipeline input data that include the filtered event data.

In some cases, the filtered event data are processed at 348 in the same or a similar manner as the original event data were processed at 326, or the filtered event data may be processed at 348 in a different manner. In some cases, the filtered event data are processed by observability pipeline processes that are parameterized, identified, or otherwise specified by the data collection job (e.g., observability pipeline processes indicated in the configuration information received at 336). For instance, the data collection job may specify a particular type of routing, streaming analytics and processing, or output schema to be applied by the example observability pipeline process 200 shown in FIG. 2.

In some cases, at 348, each worker role applies the observability pipeline process 200 shown in FIG. 2 to the subset of event data collected by the data collection task that it executes. For instance, a worker role may apply the observability pipeline process to a subset of the event data by applying schema normalization to the subset of event data (e.g., applying the schema normalization 220 in FIG. 2); routing the normalized subset of event data (e.g., applying the routing 222 in FIG. 2); generating structured output data from the normalized subset of event data (e.g., applying the streaming analytics and processing 224 in FIG. 2); and applying output schemas to the structured output data to generate a portion of the observability pipeline output data (e.g., the output schemas 226 in FIG. 2). In some cases, the schema normalization, routing, streaming analytics and processing, output schema, or other aspects of an observability pipeline process applied to the subset of event data are configured or selected according to the data collection task that collected the subset of event data from the external data storage system.

As shown in FIG. 3A, the pipeline output data generated at 348 may be handled in the same manner as the pipeline output data generated at 326. At 352 and 354, the pipeline output data generated (at 348) by processing the filtered event data are delivered to external data destinations, which include the data destinations 304 and the data storage 306. The pipeline output data delivered to the data storage 306 at 354 include the filtered event data that were retrieved from storage (at 338) and processed by the observability pipeline system 310.

Figure 4:
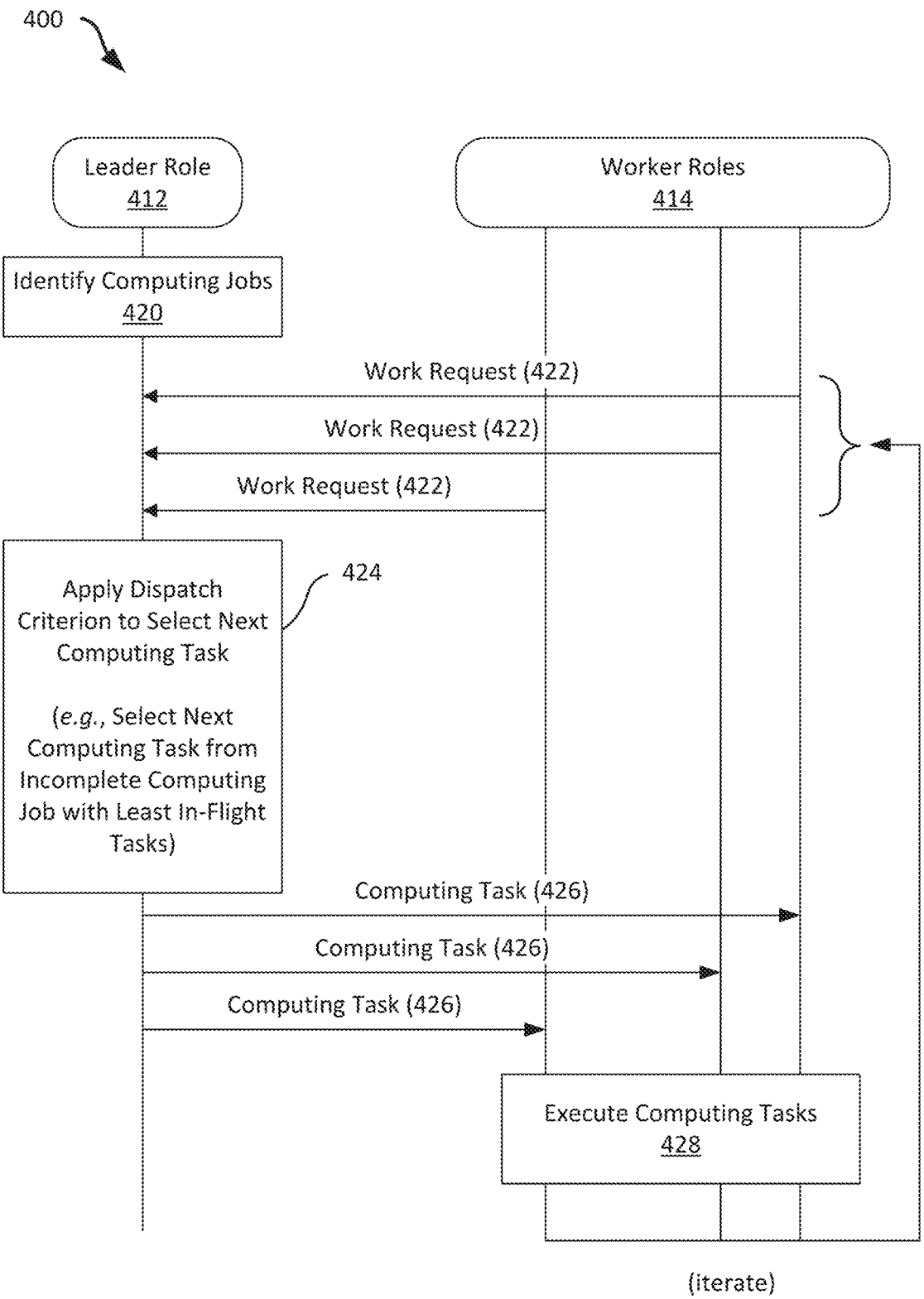
FIG. 4 is a signaling and flow diagram showing an example load balancing process performed in an observability pipeline system.

FIG. 4 is a signaling and flow diagram showing an example load balancing process performed in an observability pipeline system 400. The example observability pipeline system 400 includes one or more computer nodes that operate as a leader role 412 and multiple worker roles 414. The observability pipeline system 400 may include additional or different features. The observability pipeline system 400, the leader role 412, and the worker roles 414 shown in FIG. 4 can be implemented as the observability pipeline system 110, the leader role 112 and the worker roles 114 shown in FIG. 1, or they may be implemented in another manner.

The example process shown in FIG. 4 may include additional or different operations, and the operations may be performed in another order. In some cases, one or more of the operations can be combined, or an operation can be divided into multiple sub-processes. Certain operations may be iterated or repeated, for example, until a terminating condition is reached.

In some implementations, the observability pipeline system 400 is deployed on a distributed computer system that includes multiple computer nodes. The computer nodes in the distributed computer system may include a leader node operating as the leader role 412 and multiple worker nodes operating as the worker roles 414. In some implementations, the observability pipeline system is deployed on a standalone computer system that includes only a single computer node. The computer node of the standalone computer system can operate as the leader role 412 and the worker roles 414.

The example observability pipeline system 400 in FIG. 4 performs load balancing that determines how computing workloads are distributed across computing resources. The computing workloads can include computing jobs, computing tasks, or other types of computing workload elements. As shown in FIG. 4, the leader role 412 performs a load balancing process that determines how computing tasks are distributed to the worker roles 414. For instance, the leader role 412 may include a dispatcher (e.g., the dispatcher 116 shown in FIG. 1) or another software resource that performs the load balancing process in connection with dispatching computing tasks to the worker roles 114. The load balancing process can distribute the computing workload elements according to one or more dispatch criteria, which can be selected, calibrated, or optimized to balance the computing workload in a certain manner (e.g., according to certain priorities or objectives, etc.). In some examples, the load balancing process uses a least in-flight task dispatch criterion, a round robin dispatch criterion, or another type of dispatch criterion.

In the example shown in FIG. 4, at 420 the leader role 412 identifies computing jobs to be executed in the observability pipeline system 400. The computing jobs each include one or more computing tasks, and each computing task is associated with event data to be processed by the observability pipeline system 400. In some cases, the computing jobs and computing tasks are generated based on pipeline input data received by the observability pipeline system 400, and the pipeline input data may include event data from multiple external data sources. For example, the computing tasks may include the type of event data 202 described with respect to FIG. 2 (e.g., logs 204, metrics 206, traces 208), and the event data may be received from data sources (e.g., the data sources 102 shown in FIG. 1), data storage (e.g., the data storage 106 shown in FIG. 1), or elsewhere.

In some instances, one or more of the computing jobs identified at 420 are data collection jobs that include data collection tasks. The observability pipeline system 400 may receive configuration information that includes event filter criteria for the data collection jobs. Based on the event filter criteria, a data payload comprising the some or all of the event data may be identified, for example, as described with respect to FIGS. 3A, 3B.

At 422, one or more of the worker roles 414 request work from the leader role 412. For example, each of the worker roles 414 can independently send a work request to the leader role 412. A worker role may send a work request to indicate availability to execute a new computing task, for instance, when the worker role has completed a computing task.

At 424, the leader role 412 applies a dispatch criterion to select the next computing task to be sent to each of the worker roles 414. In an example shown in FIG. 4, the leader role 412 dispatches computing tasks to the worker roles 414 according to a least in-flight task dispatch criteria. The least in-flight task dispatch criteria is applied iteratively. For instance, the leader role 412 may iterate the least in-flight dispatch criteria upon receipt of each work request from a worker role 414.

In some implementations, an iteration of the least in-flight task dispatch criteria is applied at 424 when one of the worker roles is identified as an available worker role (e.g., based on a job request from the worker role). Upon identifying an available worker role, the leader role 412 may identify one or more incomplete computing jobs (from the computing jobs initially identified at 420). The incomplete computing jobs are the computing jobs that have one or more unexecuted computing tasks (i.e., computing tasks that have not been fully executed in the observability pipeline system 400). Next, the leader role 412 selects a particular computing job from the incomplete computing jobs.

Applying the least in-flight task dispatch criteria at 424, the leader role 412 selects the computing job that has the least number of in-flight computing tasks currently being executed in the observability pipeline system. A computing task may be considered an in-flight task when one of the worker roles 414 is currently allocated to or is currently executing the computing task. In an example where there are two computing jobs identified at 420, if the worker roles 414 are currently executing two computing tasks from a first computing job and one computing task from a second computing job, then the second computing job has the least number of in-flight computing tasks currently being executed in the observability pipeline system.

In some cases, the leader role 412 includes a dispatcher or another module that tracks (e.g., in-memory) the count of in-flight computing tasks for each computing job. The leader role 412 can update the count each time a computing task is sent to or completed by a worker role 414. For instance, the count can be tracked based on notifications (e.g., at 422, 426 or other types of notifications) communicated between the leader role 412 and worker roles 414. In some cases, each time a worker role 414 completes a task, the worker role 414 sends the leader role 412 a notification (e.g., the work request 422 or another type of notification) that indicates the computing task has been completed, and the leader role 412 then updates the count of in-flight computing tasks for the computing job associated with the computing task that was executed by the worker role.

After the leader role 412 has selected the computing job with the least in-flight tasks, the leader role 412 identifies the next computing task from the selected computing job. For example, the selected computing job may include a number of unexecuted computing tasks, and the next computing task may be identified according to an ordering or prioritization of the unexecuted computing tasks. On each iteration, after the next computing task has been identified from the selected computing job, the leader role 412 dispatches that computing task to the available worker role. For example, a particular worker role 414 may be allocated to the computing task, and the computing task may be sent to the particular worker role 414 for execution.

At 426, the leader role 412 sends computing tasks to the respective worker roles 414. For example, when the leader role 412 dispatches a computing task to an available worker role upon each iteration of applying the dispatch criteria at 424, the leader role 412 may send the computing task to the worker role 414 that it was dispatched to.

At 428, the worker roles 414 execute the computing tasks. Each of the worker roles 414 executes the computing tasks that were dispatched to the respective worker role 414. In the example shown in FIG. 4, executing each respective computing task includes applying an observability pipeline process to the event data associated with the respective computing task. In some instances, each of the computing tasks designates a subset of event data, and the worker roles 414 generate pipeline output data by executing the computing tasks. The pipeline output data may be delivered from the observability pipeline system 400 to external data destinations (e.g., data destinations 104 shown in FIG. 1). In some instances, one or more of the computing tasks is a data collection task that is executed as described with respect to FIGS. 3A, 3B, or otherwise. For instance, each respective data collection task may be executed by communicating with an external data storage system to obtain a subset of filtered event data from a data payload, streaming the subset of filtered event data to the observability pipeline process, and applying the observability pipeline process to the subset of filtered event data.

In some implementations, each worker role 414 may apply the observability pipeline process 200 shown in FIG. 2 to the event data associated with the computing tasks dispatched to the respective worker role 414. For instance, a worker role 414 may apply the observability pipeline process to the event data by applying schema normalization to the event data (e.g., applying the schema normalization 220 in FIG. 2); routing the normalized event data (e.g., applying the routing 222 in FIG. 2); generating structured output data from the normalized event data (e.g., applying the streaming analytics and processing 224 in FIG. 2); and applying output schemas to the structured output data to generate observability pipeline output data (e.g., the output schemas 226 in FIG. 2). The observability pipeline output data may then be delivered to one or more external data destinations (e.g., log analytics 250, TSDB 252, distributed tracing 254, SIEM/UBA 256, event streaming/data lake 258, shown in FIG. 2).

Figure 5:
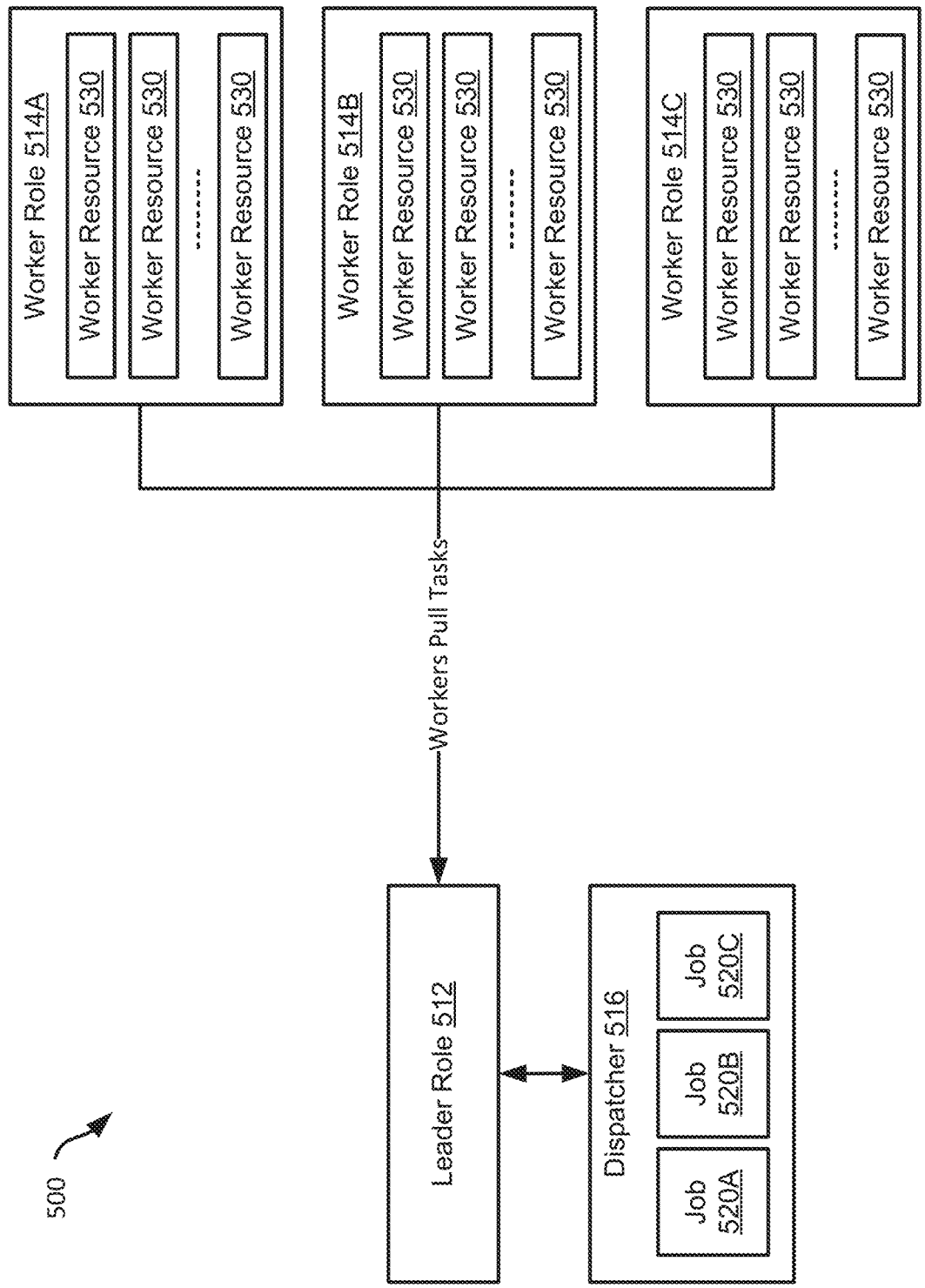
FIG. 5 is a block diagram showing an example observability pipeline system that performs load balancing.

FIG. 5 is a block diagram showing an example observability pipeline system 500 that performs load balancing. The example observability pipeline system 500 includes one or more computer nodes that operate as a leader role 512 and multiple worker roles 514. The observability pipeline system 500, the leader role 512, and the worker roles 514 shown in FIG. 5 can be implemented as the observability pipeline system 110, the leader role 112 and the worker roles 114 shown in FIG. 1, or they may be implemented in another manner.

In the example shown in FIG. 5, the leader role includes a dispatcher 516, which can perform the load balancing process shown in FIG. 4. Accordingly, the leader role 512 and worker roles 514 shown in FIG. 5 may perform the operations of the leader role 412 and the worker roles 414 shown in FIG. 4. As shown in FIG. 5, the leader role 512 dispatches computing tasks from three computing jobs 520A, 520B, 520C, and the dispatcher 516 performs a load balancing process that determines how the computing tasks are distributed across the worker roles 514.

As shown in FIG. 5, each of the example worker roles 514 includes a number of worker resources 530. Each of the worker resources 530 can execute a computing task, and the worker role 514 may send a work request to the leader role 512 to pull a computing task when the worker role 514 has an available worker resource 530. For each work request, the dispatcher 516 may select a computing task according to a dispatch criteria, and the leader role 512 can send the selected computing task to the worker role 514 for execution by one or more of its worker resources 530.

Figure 6B:
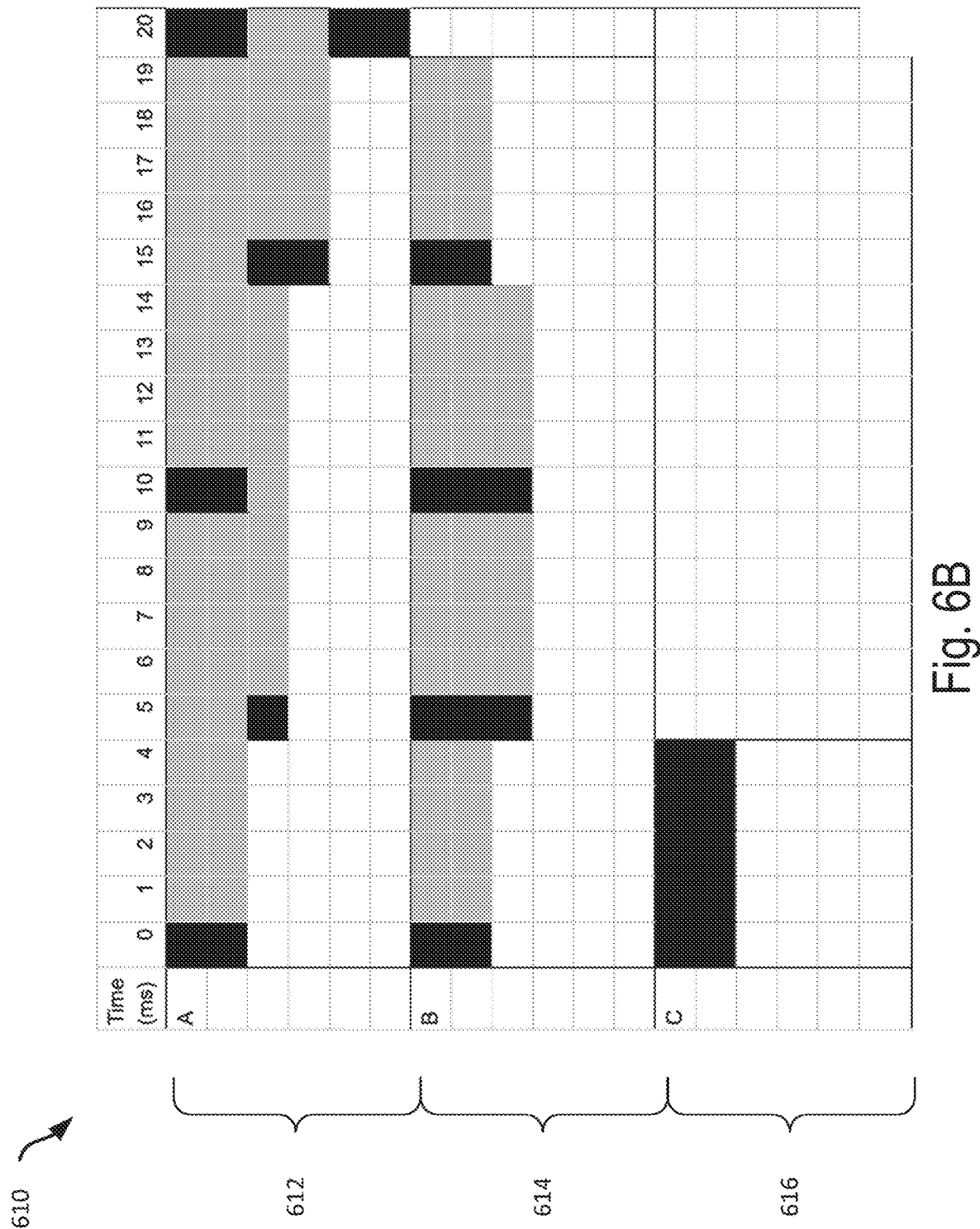
FIG. 6B is a utilization timeline showing an example load balancing process that uses a least in-flight task dispatch criteria.

FIGS. 6A and 6B represent two different dispatch criteria that the dispatcher 516 can use to dispatch computing tasks from the three computing jobs 520A, 520B, 520C. In particular, FIG. 6A is a utilization timeline 600 showing an example load balancing process that uses round robin dispatch criteria; whereas FIG. 6B is a utilization timeline 610 showing an example load balancing process that uses least in-flight task dispatch criteria.

To compare an example of round robin dispatch criteria with an example of least in-flight task dispatch criteria, the utilization timelines 600, 610 represent scheduling diagrams of a hypothetical situation where the three computing jobs 520A, 520B, 520C are executed by an observability pipeline that includes six worker roles 514 pulling tasks from the computing jobs. Here, a computing task can be considered one unit of work, and a computing job can be considered a collection of computing tasks. The dispatcher 516 is a resource executed by the leader role 512 to determine which computing job's computing task will be run next in the observability pipeline system 500.

In the example considered in FIGS. 6A and 6B, each computing job has ten computing tasks. Job 520A has ten computing tasks, each having a task duration of 10 milliseconds (10 ms); job 520B has ten computing tasks, each having a task duration of 5 milliseconds (5 ms); job 520C has ten computing tasks, each having a task duration of 1 millisecond (1 ms). The utilization timeline 600 in FIG. 6A shows how round robin scheduling will behave with these example computing job definitions over 20 ms. For comparison, the utilization timeline 610 in FIG. 6B shows how least in-flight task scheduling will behave with the example computing job definitions over 20 ms.

In each of the example utilization timelines shown in FIGS. 6A and 6B, a black box indicates the start of a task, and grey boxes indicate the duration for which the task runs. Given that there are only six worker roles in the illustrated example, there will only be six concurrently running tasks at any given time; in other words, there will only ever be six shaded boxes on any given column in the utilization timeline. In FIG. 6A, the top section 602 shows when computing tasks from computing job 520A are executed; the middle section 604 shows when computing tasks from computing job 520B are executed; and the bottom section 606 shows when computing tasks from computing job 520C are executed. Similarly, in FIG. 6B, the top section 612 shows when computing tasks from computing job 520A are executed; the middle section 614 shows when computing tasks from computing job 520B are executed; and the bottom section 616 shows when computing tasks from computing job 520C are executed.

Using the round robin dispatch criteria, as shown in the utilization timeline 600 in FIG. 6A, the number of in-flight tasks for each job are highly variable. This means that some computing jobs have more resources spent on them while others are getting significantly fewer resources allocated to them, and the computing jobs that had more in-flight tasks also had much greater execution times for tasks. For example, in a scenario where each computing task represents the collection and reading of a file/object, either from filesystem or S3, they will have highly variable execution times by nature.

From the utilization timeline 600 shown in FIG. 6A, we can gather the following empirical data. Under the round robin dispatch criteria, computing job 520A typically has about 3-4 tasks running at any given time; computing job 520B typically has about 1-2 tasks running at any given time; and computing job 520C typically has about 0-1 tasks running at any given time. We also see that none of the jobs ever reaches completion due to the way the round robin algorithm distributes resources to jobs. With this data, we can derive a formula that approximates the average number of in-flight tasks for a job at any given time. If we sum up the total amount of task durations, we get 10 ms+5 ms+1 ms=16 ms. Given this, we find the following shares of time consumed by each jobs' tasks: job 520A time ratio: 5/8; job 520B time ratio: 5/16; job 520C time ratio 1/16. From this we can determine the average number of tasks each job will have in-flight at any given time by multiplying the time ratio by the number of workers that can pull tasks:

Job 520A Average In-Flight Tasks: (5/8)*6=3.75 tasks;
Job 520B Average In-Flight Tasks: (5/16)*6=1.875 tasks;
Job 520C Average In-Flight Tasks: (1/16)*6=0.375 tasks.

From the above calculations, we found the overall formula for determining a computing job's average in-flight task count under the round robin dispatch criteria used in the example shown in FIG. 6A would be:

$$\mathrm{avg\_in\_flight}=(\mathrm{job\_task\_duration}/\mathrm{total\_task\_durations})*\mathrm{num\_workers}.$$

Using a round robin algorithm, while fair in the sense that it will not starve any one job, can be unfair when it over-allocates resources to a job made up of tasks that have longer execution times. Round robin will only be fair in a homogenous environment where the machines performing the work are similar, the jobs have a similar number of tasks, and the tasks all have similar execution times.

By contrast, as shown in FIG. 6B, using a least number of in-flight tasks job scheduling process allows observability pipeline system 500 to fairly and equally load balance work across all of the running jobs. The utilization timeline 610 in FIG. 6B shows that applying a least in-flight task dispatch criteria can load balance the number of tasks being run per job. The idea behind the least in-flight task scheduler is to allocate the next available computing resource to the computing job with the least number of current in-flight computing tasks. Doing this allows us to keep an equitable number of in-flight tasks across all the running computing jobs, so all of the computing jobs progress at a similar rate regardless of how long their computing tasks actually run.

The least in-flight task dispatch criteria also takes into account scaling up and down depending on the number of running jobs. When a new job is spawned and has no resources available to it, the dispatcher 516 applying the least in-flight task dispatch criteria will handle balancing out resources to the new job. When computing resources are freed up from the previously running jobs, they will automatically allocate to the new job with no resources until the number of in-flight tasks balance out across all jobs in the system. The same logic applies when one of the computing jobs is completed; the computing resources it was using will be distributed equally to the remaining computing jobs that the dispatcher 516 is handling.

As seen by comparing FIGS. 6A and 6B, dispatching the computing tasks according to the least in-flight task dispatch criteria (in FIG. 6B) causes computing jobs to be completed in less time compared to dispatching the computing tasks according to a round robin dispatch criteria (in FIG. 6A). For example, computing job 520C is completed in 17 ms in FIG. 6A, versus 4 ms in FIG. 6B; and computing job 520B is completed in 19 ms in FIG. 6A, versus 20 ms in FIG. 6B. This is because the computing tasks in the different computing jobs have disparate execution times (the computing tasks in job 520C have shorter execution times than the computing tasks in job 520B; and the computing tasks in job 520B have shorter execution times than the computing tasks in job 520A).

As shown in FIG. 6B, using the least in-flight tasks scheduling, both job 520B and 520C were able to complete within 20 ms of execution time, which is something that was not accomplished by the round robin scheduling represented in FIG. 6A. In this example, we can see how the least in-flight task dispatch criteria can fairly load balance the tasks being run across each of the jobs instead of gravitating resources towards the job with longer running tasks. The overall formula for determining a computing job's average in-flight task count under the least in-flight tasks dispatch criteria used in the example shown in FIG. 6B would be:

$$avg\_in\_flight = num\_workers/num\_jobs,$$

regardless of task duration. The average in-flight task count may vary in certain situations.

Figure 7:
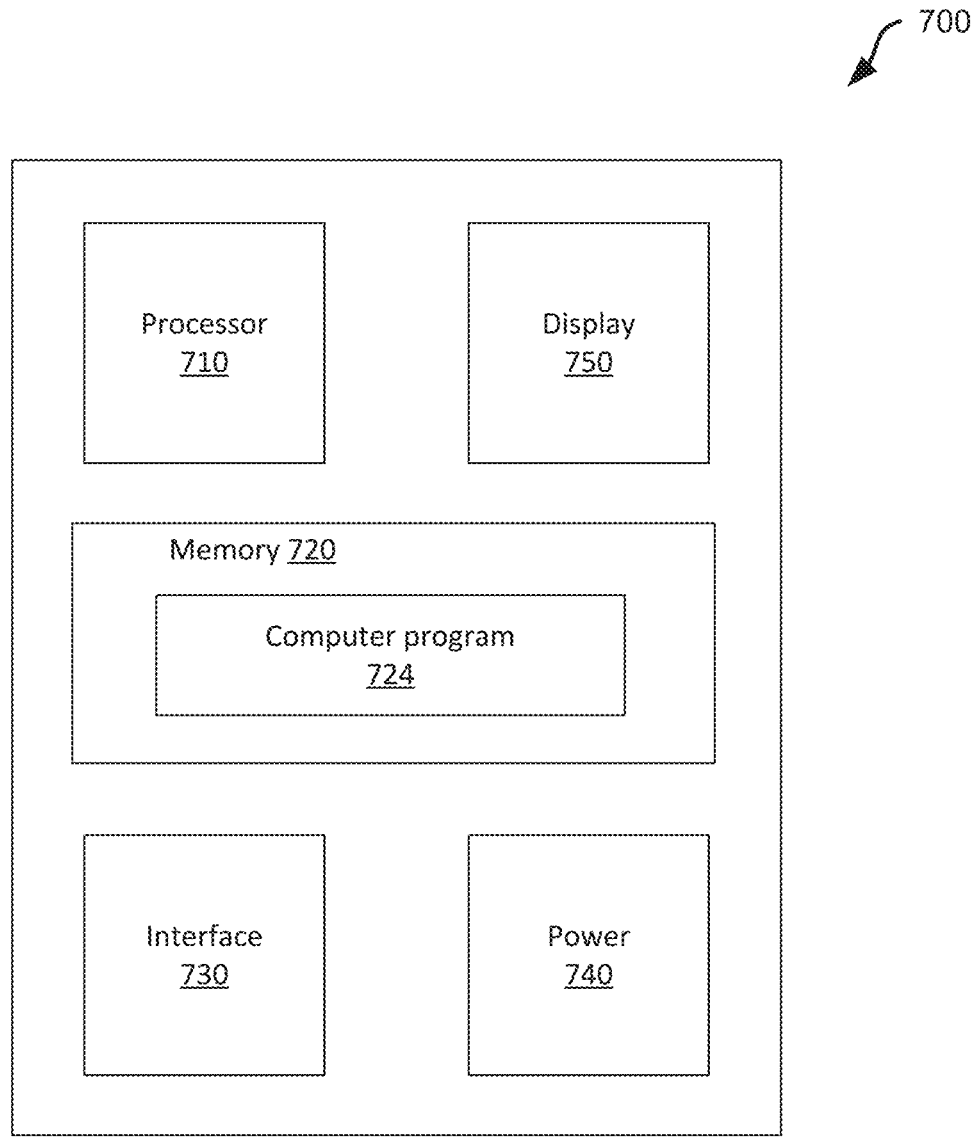
FIG. 7 is a block diagram showing an example computer system.

FIG. 7 is a block diagram showing an example of a computer system 700 that includes a data processing apparatus and one or more computer-readable storage devices. The term "data-processing apparatus" encompasses all kinds of apparatus, devices, nodes, and machines for processing data, including by way of example a programmable processor, a computer, a system on a chip, or multiple ones, or combinations, of the foregoing, e.g. processor 710. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 724, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g. processor 710, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g. memory 720. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 740 provides power to the other components of the computer system 700. For example, the other components may operate based on electrical power provided by the power unit 740 through a voltage bus or other connection. In some implementations, the power unit 740 includes a battery or a battery system, for example, a rechargeable battery. In some implementations, the power unit 740 includes an adapter (e.g., an AC adapter) that receives an external power signal (from an external source) and coverts the external power signal to an internal power signal conditioned for a component of the computer system 700. The power unit 740 may include other components or operate in another manner.

To provide for interaction with a user, operations can be implemented on a computer having a display device, e.g. display 750, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

The computer system 700 may include a single computing device, or multiple computers that operate in proximity or generally remote from each other and typically interact through a communication network, e.g. via interface 730. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

The example interface 730 may provide communication with other systems or devices. In some cases, the interface 730 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 730 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, data payloads from external data storage are processed in an observability pipeline.

In a first example, an observability pipeline system is deployed on one or more computer nodes operating as a leader role and a plurality of worker roles. Configuration information for a data collection job are received. The configuration information includes event filter criteria. By operation of the leader role, a data discovery task is generated based on the configuration information. By operation of one of the worker roles, the data discovery task is executed. Executing the data discovery task includes communicating with an external data storage system to identify a data payload that is stored on the external data storage system and contains event data that meet the event filter criteria. By operation of the leader role, a plurality of data collection tasks are generated based on the data payload identified by the execution of the data discovery task. By operation of one or more of the worker roles, the plurality of data collection tasks are executed. Executing each respective data collection task includes: communicating with the external data storage to obtain a subset of filtered event data from the data payload, each subset of filtered event data comprising a respective portion of the event data that meet the event filter criteria; streaming the subset of filtered event data to an observability pipeline process; and applying the observability pipeline process to the subset of filtered event data.

Implementations of the first example may include one or more of the following features. The configuration information is received from a user device, and the event filter criteria are based on input received through a user interface of the user device. The observability pipeline process is selected through the user interface of the user device and indicated in the configuration information from the user device.

Implementations of the first example may include one or more of the following features. The data payload is a set of files, each of the plurality of data collection tasks identifies a respective one of the files, and executing a data collection task includes communicating with the external data storage system to obtain a subset of filtered event data from the file identified by the data collection task.

Implementations of the first example may include one or more of the following features. The data payload is a set of files, a first data collection task of the plurality of data collection tasks identifies multiple files, and executing the first data collection task comprises communicating with the external data storage system to obtain a subset of filtered event data from the multiple files identified by the first data collection task. Communicating with the external data storage system to obtain a subset of filtered event data includes streaming the subset of filtered event data from the external data storage system to the observability pipeline system (e.g., to a computer node operating as a worker role).

Implementations of the first example may include one or more of the following features. Applying the observability pipeline process to the subset of filtered event data includes: applying schema normalization to the subset of filtered event data to generate normalized event data; routing the normalized event data to a streaming analytics and processing engine; generating structured data from the normalized event data by operation of the streaming analytics and processing engine; and applying one or more output schemas to the structured data to generate observability pipeline output data for one or more external data destinations.

Implementations of the first example may include one or more of the following features. The observability pipeline system is deployed on a distributed computer system comprising a leader node operating as the leader role and a plurality of worker nodes operating as the worker roles.

Implementations of the first example may include one or more of the following features. The observability pipeline system is deployed on a standalone computer system comprising a single computer operating as the leader role and the plurality of worker roles.

Implementations of the first example may include one or more of the following features. The data collection job is a full run mode data collection job, and prior to receiving the configuration information for the full run mode data collection job the observability pipeline system receives configuration information for a preview mode data collection job. The leader role generates a preview data discovery task based on the configuration information for the preview mode data collection job. One of the worker roles executes the preview data discovery task. The leader role generates a plurality of preview data collection tasks based on a data payload identified by the execution of the preview data discovery task. One or more of the worker roles execute the plurality of preview data collection tasks. Executing each respective preview data collection task includes: communicating with the external data storage to obtain a subset of filtered event data from the data payload identified by the execution of the preview data discovery task; and sending, from the observability pipeline system to a user device, the filtered event data obtained by the execution of the plurality of preview data collection tasks.

Implementations of the first example may include one or more of the following features. Prior to receiving the configuration information for the data collection job, the observability pipeline system receives pipeline input data comprising event data from a plurality of data sources. The observability pipeline system generates pipeline output data by applying one or more observability pipeline processes to the event data from the plurality of data sources. The pipeline output data are delivered to a plurality of external data destinations. Delivering the pipeline output data comprises storing the data payload on the external data storage system.

In a second example, an observability pipeline system includes one or more computer processors that perform one or more operations of the first example. In a third example, a non-transitory computer-readable medium comprises instructions that are operable when executed by data processing apparatus to perform one or more operations of the first example.

In another general aspect, load balancing is applied across compute resources in an observability pipeline.

In a fourth example, an observability pipeline system is deployed on one or more computer nodes operating as a leader role and a plurality of worker roles. A plurality of computing jobs each include a plurality of computing tasks. Each of the computing tasks is associated with event data to be processed by the observability pipeline system. The leader role dispatches the plurality of computing tasks to the plurality of worker roles according to a least in-flight task dispatch criteria. Dispatching the plurality of computing tasks according to the least in-flight task dispatch criteria comprises, iteratively: identifying one of the plurality of worker roles as an available worker role; identifying, from the plurality of computing jobs, one or more incomplete computing jobs comprising one or more computing tasks that have not been executed in the observability pipeline system; selecting, from the one or more incomplete computing jobs, a computing job that has the least number of in-flight computing tasks currently being executed in the observability pipeline system; identifying a next computing task from the selected computing job; and dispatching the next computing task to the available worker role. The worker roles execute the computing tasks dispatched to the respective worker roles. Executing each respective computing task includes applying an observability pipeline process to the event data associated with the respective computing task.

Implementations of the fourth example may include one or more of the following features. The observability pipeline system receives pipeline input data comprising at least a portion of the event data from a plurality of external data sources. At least a subset of the plurality of computing jobs are generated based on the pipeline input data. Each of the computing tasks comprises a respective subset of the event data, and the worker roles generate pipeline output data by executing the computing tasks. The pipeline output data are delivered from the observability pipeline system to a plurality of external data destinations.

Implementations of the fourth example may include one or more of the following features. One or more of the computing jobs are data collection jobs. Each of the data collection jobs comprises a plurality of data collection tasks. Configuration information includes event filter criteria for the data collection jobs. Based on the event filter criteria, a data payload comprising the some or all of the event data is identified. Executing each respective data collection task includes: communicating with an external data storage system to obtain a subset of filtered event data from the data payload, each subset of filtered event data comprising a respective portion of the event data; streaming the subset of filtered event data to the observability pipeline process; and applying the observability pipeline process to the subset of filtered event data.

Implementations of the fourth example may include one or more of the following features. Applying the observability pipeline process to the event data includes: applying schema normalization to the event data to generate normalized event data; routing the normalized event data to a streaming analytics and processing engine; generating structured output data from the normalized event data by operation of the streaming analytics and processing engine; applying output schemas to the structured output data to generate observability pipeline output data for a plurality of external data destinations.

Implementations of the fourth example may include one or more of the following features. The available worker role is identified based on a work request from the available worker role. Dispatching the next computing task to the available worker role includes sending the next computing task from the leader role to the available worker role in response to the work request.

Implementations of the fourth example may include one or more of the following features. The plurality of computing jobs includes a first computing job and a second computing job (and possibly additional computing jobs). Dispatching the plurality of computing tasks according to the least in-flight task dispatch criteria causes the first computing job to be completed in less time compared to dispatching the plurality of computing tasks according to a round robin dispatch criteria. The first computing job contains a first plurality of computing tasks; the second computing job contains a second plurality of computing tasks; and the first plurality of computing tasks all have shorter execution times than the second plurality of computing tasks.

Implementations of the fourth example may include one or more of the following features. The observability pipeline system is deployed on a distributed computer system that includes a leader node operating as the leader role and a plurality of worker nodes operating as the worker roles.

Implementations of the fourth example may include one or more of the following features. The observability pipeline system is deployed on a standalone computer system comprising a single computer operating as the leader role and the plurality of worker roles.

In a fifth example, an observability pipeline system includes one or more processors that perform one or more operations of the fourth example. In a sixth example, a non-transitory computer-readable medium comprises instructions that are operable when executed by data processing apparatus to perform one or more operations of the fourth example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of load balancing across computing resources in an observability pipeline system, the method comprising:
   in an observability pipeline system deployed on one or more computer nodes operating in a leader role and a plurality of worker roles, identifying a plurality of computing jobs, each of the computing jobs comprising a plurality of computing tasks;
   by operation of the leader role, dispatching the plurality of computing tasks to the plurality of worker roles, wherein dispatching the plurality of computing tasks comprises, iteratively:
      identifying one of the plurality of worker roles as an available worker role;
      identifying, from the plurality of computing jobs, one or more incomplete computing jobs comprising one or more computing tasks that have not been executed in the observability pipeline system;
      selecting, from the one or more incomplete computing jobs, a computing job that has the least number of in-flight computing tasks currently being executed in the observability pipeline system;

identifying a next computing task from the selected computing job; and dispatching the next computing task to the available worker role;

by operation of the worker roles in the observability pipeline system, executing the computing tasks dispatched to the respective worker roles.

2. The method of claim 1, comprising:

at the observability pipeline system, receiving pipeline input data comprising at least a portion of event data from a plurality of external data sources;

generating at least a subset of the plurality of computing jobs based on the pipeline input data, wherein each of the computing tasks comprises a respective subset of the event data, and the worker roles generate pipeline output data by executing the computing tasks; and delivering the pipeline output data from the observability pipeline system to a plurality of external data destinations.

3. The method of claim 1, wherein one or more of the computing jobs are data collection jobs, each of the data collection jobs comprises a plurality of data collection tasks, and the method comprises:

receiving configuration information comprising event filter criteria for the data collection jobs; and based on the event filter criteria, identifying a data payload comprising at least a portion of event data, wherein executing the computing tasks comprises executing each respective data collection task comprising:

communicating with an external data storage system to obtain a subset of filtered event data from the data payload, each subset of filtered event data comprising a respective portion of the event data; and streaming the subset of filtered event data to an observability pipeline process.

4. The method of claim 1, comprising applying an observability pipeline process to event data that comprises:

applying schema normalization to the event data to generate normalized event data;

routing the normalized event data to a streaming analytics and processing module;

generating structured output data from the normalized event data by operation of the streaming analytics and processing module; and applying output schemas to the structured output data to generate observability pipeline output data for a plurality of external data destinations.

5. The method of claim 1, wherein the available worker role is identified based on a work request from the available worker role, and dispatching the next computing task to the available worker role comprises sending the next computing task from the leader role to the available worker role in response to the work request.

6. The method of claim 1, wherein:

the plurality of computing jobs comprises a first computing job and a second computing job, and dispatching the plurality of computing tasks comprises dispatching the plurality of computing tasks according to a least in-flight task dispatch criterion that causes the first computing job to be completed in less time compared to dispatching the plurality of computing tasks according to a round robin dispatch criterion.

7. The method of claim 6, wherein:

the first computing job comprises a first plurality of computing tasks, the second computing job comprises a second plurality of computing tasks, and the first plurality of computing tasks all have shorter execution times than the second plurality of computing tasks.

8. The method of claim 1, wherein the observability pipeline system is deployed on a distributed computer system comprising a leader node operating as the leader role and a plurality of worker nodes operating as the worker roles.

9. The method of claim 1, wherein the observability pipeline system is deployed on a standalone computer system comprising a single computer node operating as the leader role and the plurality of worker roles.

10. An observability pipeline system comprising one or more computer nodes that operate a leader role and a plurality of worker roles, the one or more computer nodes comprising:

one or more processors; and memory storing instructions that, when executed by the one or more processors, cause the one or more processors to perform operations comprising:

identifying a plurality of computing jobs, each of the computing jobs comprising a plurality of computing tasks;

by operation of the leader role, dispatching the plurality of computing tasks to the plurality of worker roles, wherein dispatching the plurality of computing tasks comprises, iteratively:

identifying one of the plurality of worker roles as an available worker role;

identifying, from the plurality of computing jobs, one or more incomplete computing jobs comprising one or more computing tasks that have not been executed in the observability pipeline system;

selecting, from the one or more incomplete computing jobs, a computing job that has the least number of in-flight computing tasks currently being executed in the observability pipeline system;

identifying a next computing task from the selected computing job; and dispatching the next computing task to the available worker role;

by operation of the worker roles in the observability pipeline system, executing the computing tasks dispatched to the respective worker roles.

11. The system of claim 10, the operations comprising:

at the observability pipeline system, receiving pipeline input data comprising at least a portion of event data from a plurality of external data sources;

generating at least a subset of the plurality of computing jobs based on the pipeline input data, wherein each of the computing tasks comprises a respective subset of the event data, and the worker roles generate pipeline output data by executing the computing tasks; and delivering the pipeline output data from the observability pipeline system to a plurality of external data destinations.

12. The system of claim 10, wherein one or more of the computing jobs are data collection jobs, each of the data collection jobs comprises a plurality of data collection tasks, and the operations comprise:

receiving configuration information comprising event filter criteria for the data collection jobs; and based on the event filter criteria, identifying a data payload comprising at least a portion of event data, wherein executing the computing tasks comprises executing each respective data collection task comprising:
 communicating with an external data storage system to obtain a subset of filtered event data from the data payload, each subset of filtered event data comprising a respective portion of the event data; and
 streaming the subset of filtered event data to an observability pipeline process.

13. The system of claim 10, the operations comprising applying an observability pipeline process to event data that comprises:
 applying schema normalization to the event data to generate normalized event data;
 routing the normalized event data to a streaming analytics and processing module;
 generating structured output data from the normalized event data by operation of the streaming analytics and processing module; and
 applying output schemas to the structured output data to generate observability pipeline output data for a plurality of external data destinations.

14. The system of claim 10, wherein the available worker role is identified based on a work request from the available worker role, and dispatching the next computing task to the available worker role comprises sending the next computing task from the leader role to the available worker role in response to the work request.

15. The system of claim 10, wherein:
 the plurality of computing jobs comprises a first computing job and a second computing job, and
 dispatching the plurality of computing tasks comprising dispatching the plurality of computing tasks according to a least in-flight task dispatch criterion that causes the first computing job to be completed in less time compared to dispatching the plurality of computing tasks according to a round robin dispatch criterion.

16. The system of claim 15, wherein:
 the first computing job comprises a first plurality of computing tasks,
 the second computing job comprises a second plurality of computing tasks, and
 the first plurality of computing tasks all have shorter execution times than the second plurality of computing tasks.

17. The system of claim 10, wherein the observability pipeline system comprises a distributed computer system comprising a leader node that operates as the leader role and a plurality of worker nodes that operate as the worker roles.

18. The system of claim 10, wherein the observability pipeline system comprises a standalone computer system comprising a single computer node operating as the leader role and the plurality of worker roles.

19. A non-transitory computer-readable medium comprising instructions that are operable when executed by data processing apparatus to perform operations comprising:
 defining a leader role and a plurality of worker roles of an observability pipeline system;
 identifying a plurality of computing jobs, each of the computing jobs comprising a plurality of computing tasks;
 by operation of the leader role, dispatching the plurality of computing tasks to the plurality of worker roles, wherein dispatching the plurality of computing tasks comprises, iteratively:
  identifying one of the plurality of worker roles as an available worker role;
  identifying, from the plurality of computing jobs, one or more incomplete computing jobs comprising one or more computing tasks that have not been executed in the observability pipeline system;
  selecting, from the one or more incomplete computing jobs, a computing job that has the least number of in-flight computing tasks currently being executed in the observability pipeline system;
  identifying a next computing task from the selected computing job; and
  dispatching the next computing task to the available worker role;
 by operation of the worker roles in the observability pipeline system, executing the computing tasks dispatched to the respective worker roles.

20. The non-transitory computer-readable medium of claim 19, wherein one or more of the computing jobs are data collection jobs, each of the data collection jobs comprises a plurality of data collection tasks, and the operations comprise:
 receiving configuration information comprising event filter criteria for the data collection jobs; and
 based on the event filter criteria, identifying a data payload comprising at least a portion of event data,
 wherein executing the computing tasks comprises executing each respective data collection task comprises:
  communicating with an external data storage system to obtain a subset of filtered event data from the data payload, each subset of filtered event data comprising a respective portion of the event data;
  streaming the subset of filtered event data to the observability pipeline process.

* * * * *